(12) United States Patent
Yang et al.

(10) Patent No.: US 10,594,359 B2
(45) Date of Patent: Mar. 17, 2020

(54) COMMUNICATION DATA SENDING METHOD AND DEVICE, AND USER EQUIPMENT

(71) Applicant: ZTE CORPORATION, Shenzhen, Guangdong Province (CN)

(72) Inventors: Jin Yang, Shenzhen (CN); Shuanshuan Wu, Shenzhen (CN); Wenhuan Wang, Shenzhen (CN); Yifei Yuan, Shenzhen (CN); Ming Yuan, Shenzhen (CN); Shuanghong Huang, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 133 days.

(21) Appl. No.: 15/309,208

(22) PCT Filed: Sep. 19, 2014

(86) PCT No.: PCT/CN2014/086969
§ 371 (c)(1),
(2) Date: Nov. 7, 2016

(87) PCT Pub. No.: WO2015/169026
PCT Pub. Date: Nov. 12, 2015

(65) Prior Publication Data
US 2017/0079085 A1    Mar. 16, 2017

(30) Foreign Application Priority Data
May 8, 2014   (CN) .......................... 2014 1 0193167

(51) Int. Cl.
*H04B 1/713*    (2011.01)
*H04W 72/02*    (2009.01)
(Continued)

(52) U.S. Cl.
CPC .............. *H04B 1/713* (2013.01); *H04W 4/70* (2018.02); *H04W 72/02* (2013.01);
(Continued)

(58) Field of Classification Search
CPC ................... H04W 4/70; H04W 72/02; H04W 72/0406–042; H04W 72/0446–0453; H04W 76/14; H04W 76/23
See application file for complete search history.

(56) References Cited

U.S. PATENT DOCUMENTS

2015/0271846 A1*  9/2015  Kowalski .............. H04W 72/14
                                                    370/329
2017/0048856 A1*  2/2017  Sorrentino ............. H04B 1/713

FOREIGN PATENT DOCUMENTS

CN        103002594 A       3/2013
CN        103686985 A       3/2014
(Continued)

OTHER PUBLICATIONS

R1-141349; Control design for D2D broadcast communication; LG Electronics; 3GPP TSG RAN WG1 Meeting #76bis; Shenzhen, China, Mar. 31-Apr. 4, 2014.
(Continued)

*Primary Examiner* — Eric Myers
(74) *Attorney, Agent, or Firm* — Cantor Colburn LLP

(57) ABSTRACT

The present document discloses a communication data sending method and device, and user equipment, herein the communication data sending method includes: UE indicating a D2D data channel resource through D2D data channel resource indication information in D2D control indication information and/or index information corresponding to the D2D control indication information; and the UE sending D2D communication data on the D2D data channel resource. Through the present document, the problem that a
(Continued)

transmitting UE for D2D communication is unable to indicate the used D2D data channel resource by using an eNB scheduling indication resource in the cellular communication is solved, and the indication of the D2D data channel resource is realized.

8 Claims, 8 Drawing Sheets

(51) Int. Cl.
  *H04W 76/14* (2018.01)
  *H04W 4/70* (2018.01)
  *H04W 72/04* (2009.01)
(52) U.S. Cl.
  CPC ... *H04W 72/0406* (2013.01); *H04W 72/0446* (2013.01); *H04W 72/0453* (2013.01); *H04W 76/14* (2018.02)

(56) References Cited

FOREIGN PATENT DOCUMENTS

| CN | 103716273 A | 4/2014 |
|---|---|---|
| EP | 2688226 A2 | 1/2014 |
| WO | WO2013062310 A1 | 5/2013 |

OTHER PUBLICATIONS

R1-141391; On Scheduling Assignments and Receiver Behaviour; Ericsson; 3GPP TSG RAN WG1 Meeting #76bis; Shenzhen, China, Mar. 31-Apr. 4, 2014.

R1-141685; On Scheduling Assignments Design; CEWiT; 3GPP TSG RAN WG1 Meeting #76bis; Shenzhen, China, Mar. 31-Apr. 4, 2014.

R2-141838; Introduction of ProSe in 36.300; Qualcomm Incorporated; 3GPP TSG-RAN WG2 #85 Bis; Valencia, Spain Mar. 31-Apr. 4, 2014.

* cited by examiner

COMMUNICATION DATA SENDING METHOD AND DEVICE, AND USER EQUIPMENT

TECHNICAL FIELD

The present document relates to the field of communication, in particular to a communication data sending method and device, and user equipment.

BACKGROUND OF THE RELATED ART

In a Device to Device (D2D) communication system, when a service which needs to be transmitted exists between User Equipment (UEs), service data between the UEs are not forwarded by a base station but are directly transmitted to a target UE by a data source UE through an air interface. FIG. 1 illustrates a schematic diagram of a D2D communication structure according to the related art. As illustrated in FIG. 1, this communication mode has features which are obviously different from the features of the communication mode of the traditional cellular system. For near-distance communication users who can apply the D2D communication mode, D2D transmission not only can save radio spectrum resources, but also can reduce the data transmission pressure of a core network, and can reduce the occupied system resources, increase the spectrum efficiency of the cellular communication system, reduce the transmitting power consumption of the terminal and reduce the network operating cost to a very great extent.

In the traditional cellular communication system, radio resources of UE are uniformly controlled and scheduled by an evolved NodeB (eNB), the eNB indicates downlink or uplink resources configured by the UE through a Physical Downlink Control Channel (PDCCH), and the UE indicates to receive data signals transmitted by the eNB on corresponding downlink resources or transmit signals to the eNB on uplink resources according to the configuration by the eNB.

In a Long Term Evolution (LTE) system, radio resources are divided in a time domain by using radio frame as a unit, and each radio frame is 10 ms and includes 10 subframes. Each subframe is 1 ms and is divided into 2 slots which are respectively 0.5 ms, as illustrated in FIG. 2. When a system frame structure adopts a Normal Cyclic Prefix (Normal CP), each subframe includes 14 Single-carrier Frequency Division Multiple Access (SC-FDMA) symbols or Orthogonal Frequency Division Multiplexing (OFDM) symbols, and is divided into 2 slots, herein each slot includes 7 symbols. When the system frame structure adopts an Extended Cyclic Prefix (Extended CP), each subframe includes 12 symbols and each slot includes 6 symbols. In a frequency domain, resources are divided by using subcarrier as a unit. Each subcarrier includes 15 kHz or 7.5 kHz resources.

According to the division unit of the time domain and frequency domain resources, the eNB schedules the minimum unit of time and frequency resources as a Resource Block (RB) for the UE, the RB is defined as 1 slot on the time domain and continuous $N_{sc}^{RB}$ subcarriers on the frequency domain, $N_{sc}^{RB}=12, 24$, as illustrated in FIG. 3, the eNB specifically has two modes for resource allocation indication of the UE, i.e., a resource allocation indication type 0 and a resource allocation indication type 1, and based on the two resource allocation indication types, the eNB can flexibly schedule and indicate one or more RB resources for the UE.

In cellular communication, the eNB schedules and indicates Physical Downlink Shared Channel (PDSCH) resources configured at current subframes to the UE on PDCCH resources of downlink subframes # n, and the UE receives the indication information in the PDCCH, receives signals on corresponding RBs in the subframes # n according to the indication information and obtains data transmitted by the eNB, as illustrated in FIG. 4. Therefore, in D2D communication, when the transmitting UE indicates the used D2D data channel resources to the receiving UE, the method for the eNB to schedule and indicate the resources to the UE in the cellular communication cannot be used.

Aiming at the problem that the transmitting UE for D2D communication in the related art cannot indicate the used D2D data channel resource, no effective solution has been put forward.

SUMMARY

The embodiments of the present document provide a communication data sending method and device, and user equipment, so as to at least solve the problem.

According to one aspect of the embodiment of the present document, the present document provides a communication data sending method, including: UE indicating a Device to Device (D2D) data channel resource through D2D data channel resource indication information in D2D control indication information and/or index information corresponding to the D2D control indication information; and the UE sending D2D communication data on the D2D data channel resource, herein the UE indicating the D2D data channel resource through the D2D data channel resource indication information and/or the index information includes at least one of the following: the UE indicating a time domain resource and a frequency domain resource of the D2D data channel through the D2D data channel resource indication information; the UE indicating a time domain resource of the D2D data channel through the D2D data channel resource indication information and indicating a frequency domain resource of the D2D data channel through the index information; the UE indicating a frequency domain resource of the D2D data channel through the D2D data channel resource indication information and indicating a time domain resource of the D2D data channel through the index information; and the UE indicating a time domain resource and a frequency domain resource of the D2D data channel through the index information.

Alternatively, the D2D control indication information is used for indicating control information related to transmission of the D2D communication data, herein the D2D data channel resource indication information carried in the D2D control indication information is used for indicating the D2D data channel resource for bearing the D2D communication data; and herein the D2D data channel resource indication information includes indication information for indicating the time domain resource of the D2D data channel and/or indication information for indicating the frequency domain resource of the D2D data channel.

Alternatively, the D2D control indication information is born on one of following resources: D2D control channel resource, D2D data channel resource and D2D scheduling indication resource.

Alternatively, he D2D data channel resource indication information is contained in the D2D control indication information and indicates the time domain resource and/or the frequency domain resource of the D2D data channel through indication information of N bits.

Alternatively, under a situation that the D2D data channel resource indication information indicates the time domain resource and the frequency domain resource of the D2D data channel through the indication information of N bits, the method further includes: indicating the time domain resource of the D2D data channel through indication information of N1 bits, and indicating the frequency domain resource of the D2D data channel through indication information of N2 bits, herein N1+N2=N; or indicating the time domain resource and the frequency domain resource of the D2D data channel through the indication information of N bits according to a predefined corresponding relation between indication information of N bits and a resource pattern of the D2D data channel.

Alternatively, the predefined corresponding relation between the indication information of N bits and the resource pattern of the D2D data channel includes: each predefined value of value of indication information of N bits corresponding to a fixed resource pattern of the D2D data channel, herein the resource pattern contains one or more fixed D2D data subframes used for sending the D2D communication data and one or more fixed Resource Blocks (RBs) on each D2D data subframe.

Alternatively, under a situation that the D2D data channel resource indication information indicates the time domain resource of the D2D data channel through indication information of N bits or N1 bits, the method further includes: indicating the time domain resource of the D2D data channel through the indication information of N bits or N1 bits by a way of a bitmap, herein the time domain resource of the D2D data channel refers to one or more D2D data subframes contained by the D2D data channel in a time domain and used for sending the D2D communication data; or indicating the time domain resource of the D2D data channel through the indication information of N bits or N1 bits by a way of a timing pattern, herein the time domain resource of the D2D data channel refers to one or more D2D data subframes contained by the D2D data channel in a time domain and used for sending the D2D communication data.

Alternatively, under a situation that the time domain resource of the D2D data channel is indicated through the indication information of N bits or N1 bits by a way of a bitmap, the indication information of N bits or N1 bits corresponds to N or N1 D2D data subframes, and the method further includes: under a situation that a bit in the bitmap is indicated to be "1", indicating that the corresponding D2D data subframe is the time domain resource of the D2D data channel, and under a situation that the bit in the bitmap is indicated to be "0", indicating that the corresponding D2D data subframe is not the time domain resource of the D2D data channel; or under a situation that the bit in the bitmap is indicated to be "0", indicating that the corresponding D2D data subframe is the time domain resource of the D2D data channel, and under a situation that the bit in the bitmap is indicated to be "1", indicating that the corresponding D2D data subframe is not the time domain resource of the D2D data channel.

Alternatively, under a situation that the time domain resource of the D2D data channel is indicated through the indication information of N bits or N1 bits by a way of the timing pattern, the method further includes: indicating the one or more D2D data subframes contained by the D2D data channel in the time domain through indication information of N bits or N1 bits according to a predefined corresponding relation between indication information of N bits or N1 bits and the timing pattern, herein the predefined corresponding relation between the indication information of N bits or N1 bits and the timing pattern includes: each predefined value of indication information of N bits or N1 bits corresponding to a fixed timing pattern of the D2D data subframes, herein the timing pattern contains one or more fixed D2D data subframes.

Alternatively, under a situation that the D2D data channel resource indication information indicates the frequency domain resource of the D2D data channel through indication information of N bits or N2 bits, the method further includes: indicating one or more RBs contained by the D2D data channel in the frequency domain through the indication information of N bits or N2 bits in a resource allocation indication type 0 or a resource allocation indication type 1.

Alternatively, under a situation that the D2D data channel resource indication information indicates the frequency domain resource of the D2D data channel through indication information of N bits or N2 bits, the method further includes: indicating one or more RBs contained by the D2D data channel in the frequency domain through indication information of N bits or N2 bits according to a predefined corresponding relation between indication information of N bits or N2 bits and a frequency pattern, herein the predefined corresponding relation between the indication information of N bits or N2 bits and the frequency pattern includes: each predefined value of indication information of N bits or N2 bits corresponding to a fixed frequency pattern, herein the frequency pattern contains one or more fixed RBs.

Alternatively, the indication information of N bits or N2 bits is further used for indicating whether to perform frequency hopping on the frequency domain resource of the D2D data channel and a mode for performing the frequency hopping.

Alternatively, under a situation that the allocation of the time domain resource of the D2D data channel is indicated through the index information, the method further includes: indicating one or more D2D data subframes contained by the D2D data channel in the time domain and used for sending the D2D communication data according to a predefined corresponding relation between the index information and a timing pattern, herein the predefined corresponding relation between the index information and the timing pattern includes: each predefined value of index information corresponding to a fixed timing pattern of the D2D data subframes, herein the timing pattern contains one or more fixed D2D data subframes.

Alternatively, under a situation that the frequency domain resource of the D2D data channel is indicated through the index information, the method further includes: indicating one or more RBs contained by the D2D data channel in the time domain according to a predefined corresponding relation between the index information and a frequency pattern, herein the predefined corresponding relation between the index information and the frequency pattern includes: each predefined value of index information corresponding to a fixed frequency pattern, herein the frequency pattern contains one or more fixed RBs.

Alternatively, under a situation that the time domain resource and the frequency domain resource of the D2D data channel are indicated through the index information, the method further includes: indicating the time domain and frequency domain resources of the D2D data channel according to a predefined corresponding relation between the index information and a resource pattern of the D2D data channel, herein the predefined corresponding relation between the index information and the resource pattern of the D2D data channel includes: each predefined value of index information corresponding to a fixed resource pattern of the D2D data channel, herein the resource pattern contains one or more fixed D2D data subframes used for sending the D2D communication data and one or more fixed RBs on each D2D data sub frame.

Alternatively, the index information includes at least one of the following: a channel index number/resource index number/frequency domain resource block index number corresponding to a D2D control channel resource for bearing the D2D control indication information, a channel index number/resource index number/frequency domain resource block index number corresponding to a D2D data channel resource for bearing the D2D control indication information, and a channel index number/resource index number/frequency domain resource block index number corresponding to a D2D scheduling indication resource for bearing the D2D control indication information.

According to another aspect of the embodiment of the present document, the present document further provides a communication data sending device, located in User Equipment (UE), including: an indication module configured to indicate a Device to Device (D2D) data channel resource through D2D data channel resource indication information in D2D control indication information and/or index information corresponding to the D2D control indication information; and a sending module configured to send D2D communication data on the D2D data channel resource, herein the indication module is configured to perform at least one of the following: indicating a time domain resource and a frequency domain resource of the D2D data channel through the D2D data channel resource indication information; indicating a time domain resource of the D2D data channel through the D2D data channel resource indication information and indicating a frequency domain resource of the D2D data channel through the index information; indicating a frequency domain resource of the D2D data channel through the D2D data channel resource indication information and indicating a time domain resource of the D2D data channel through the index information; and indicating a time domain resource and a frequency domain resource of the D2D data channel through the index information.

Alternatively, the D2D control indication information is used for indicating control information related to transmission of the D2D communication data, herein the D2D data channel resource indication information carried in the D2D control indication information is used for indicating the D2D data channel resource for bearing the D2D communication data; and herein the D2D data channel resource indication information includes indication information for indicating the time domain resource of the D2D data channel and/or indication information for indicating the frequency domain resource of the D2D data channel.

Alternatively, the indication module is further configured to bear the D2D control indication information on one of the following resources for sending: D2D control channel resource, D2D data channel resource and D2D scheduling indication resource.

Alternatively, the indication module is further configured to generate the D2D control indication information, herein the D2D data channel resource indication information is contained in the D2D control indication information and indicates the time domain resource and/or the frequency domain resource of the D2D data channel through indication information of N bits.

Alternatively, under a situation that the D2D data channel resource indication information indicates the time domain resource and the frequency domain resource of the D2D data channel through the indication information of N bits, the indication module is further configured to: indicate the time domain resource of the D2D data channel through indication information of N1 bits, and indicate the frequency domain resource of the D2D data channel through indication information of N2 bits, herein N1+N2=N; or indicate the time domain resource and the frequency domain resource of the D2D data channel through the indication information of N bits according to a predefined corresponding relation between indication information of N bits and a resource pattern of the D2D data channel.

Alternatively, the predefined corresponding relation between the indication information of N bits and the resource pattern of the D2D data channel includes: each predefined value of indication information of N bits corresponding to a fixed resource pattern of the D2D data channel, herein the resource pattern contains one or more fixed D2D data subframes used for sending the D2D communication data and one or more fixed Resource Blocks (RBs) on each D2D data subframe.

Alternatively, under a situation that the D2D data channel resource indication information indicates the time domain resource of the D2D data channel through indication information of N bits or N1 bits, the indication module is further configured to: indicate the time domain resource of the D2D data channel through the indication information of N bits or N1 bits by a way of a bitmap, herein the time domain resource of the D2D data channel refers to one or more D2D data subframes contained by the D2D data channel in a time domain and used for sending the D2D communication data; or indicate the time domain resource of the D2D data channel through the indication information of N bits or N1 bits by a way of a timing pattern, herein the time domain resource of the D2D data channel refers to one or more D2D data subframes contained by the D2D data channel in a time domain and used for sending the D2D communication data.

Alternatively, under a situation that the time domain resource of the D2D data channel is indicated through the indication information of N bits or N1 bits by a way of a bitmap, the indication information of N bits or N1 bits corresponds to N or N1 D2D data subframes, and the indication module is further configured to: under a situation that a bit in the bitmap is indicated to be "1", indicate that the corresponding D2D data subframe is the time domain resource of the D2D data channel, and under a situation that the bit in the bitmap is indicated to be "0", indicate that the corresponding D2D data subframe is not the time domain resource of the D2D data channel; or under a situation that the bit in the bitmap is indicated to be "0", indicate that the corresponding D2D data subframe is the time domain resource of the D2D data channel, and under a situation that the bit in the bitmap is indicated to be "1", indicate that the corresponding D2D data subframe is not the time domain resource of the D2D data channel.

Alternatively, under a situation that the time domain resource of the D2D data channel is indicated through the indication information of N bits or N1 bits by a way of the timing pattern, the indication module is further configured to: indicate the one or more D2D data subframes contained by the D2D data channel in the time domain through indication information of N bits or N1 bits according to a predefined corresponding relation between indication information of N bits or N1 bits and the timing pattern, herein the predefined corresponding relation between the indication information of N bits or N1 bits and the timing pattern includes: each predefined value of indication information of N bits or N1 bits corresponding to a fixed timing pattern of the D2D data subframes, herein the timing pattern contains one or more fixed D2D data subframes.

Alternatively, under a situation that the D2D data channel resource indication information indicates the frequency domain resource of the D2D data channel through indication information of N bits or N2 bits, the indication module is further configured to: indicate one or more RBs contained by the D2D data channel in the frequency domain through the indication information of N bits or N2 bits in a resource allocation indication type 0 or a resource allocation indication type 1.

Alternatively, under a situation that the D2D data channel resource indication information indicates the frequency domain resource of the D2D data channel through indication information of N bits or N2 bits, the indication module is further configured to: indicate one or more RBs contained by the D2D data channel in the frequency domain through indication information of N bits or N2 bits according to a predefined corresponding relation between indication information of N bits or N2 bits and a frequency pattern, herein the predefined corresponding relation between the indication information of N bits or N2 bits and the frequency pattern includes: each predefined value of indication information of N bits or N2 bits corresponding to a fixed frequency pattern, herein the frequency pattern contains one or more fixed RBs.

Alternatively, the indication information of N bits or N2 bits is further used for indicating whether to perform frequency hopping on the frequency domain resource of the D2D data channel and a mode for performing the frequency hopping.

Alternatively, under a situation that the allocation of the time domain resource of the 2D data channel is indicated through the index information, the indication module is further configured to: indicate one or more D2D data subframes contained by the D2D data channel in the time domain and used for sending the D2D communication data according to a predefined corresponding relation between the index information and a timing pattern, herein the predefined corresponding relation between the index information and the timing patterns includes: each predefined value of index information corresponding to a fixed timing pattern of the D2D data subframes, herein the timing pattern contains one or more fixed D2D data subframes.

Alternatively, under a situation that the frequency domain resource of the D2D data channel is indicated through the index information, the indication module is further configured to: indicate one or more RBs contained by the D2D data channel in the time domain according to a predefined corresponding relation between the index information and a frequency pattern, herein the predefined corresponding relation between the index information and the frequency patterns includes: each predefined value of index information corresponding to a fixed frequency pattern, herein the frequency pattern contains one or more fixed RBs.

Alternatively, under a situation that the time domain resource and the frequency domain resource of the D2D data channel are indicated through the index information, the indication module is further configured to: indicate the time domain and frequency domain resources of the D2D data channel according to a predefined corresponding relation between the index information and a resource pattern of the D2D data channel, herein the predefined corresponding relation between the index information and the resource pattern of the D2D data channel includes: each predefined value of index information corresponding to a fixed resource pattern of the D2D data channel, herein the resource pattern contains one or more fixed D2D data subframes used for sending the D2D communication data and one or more fixed RBs on each D2D data subframe.

Alternatively, the index information includes at least one of the following: a channel index number/resource index number/frequency domain resource block index number corresponding to a D2D control channel resource for bearing the D2D control indication information, a channel index number/resource index number/frequency domain resource block index number corresponding to a D2D data channel resource for bearing the D2D control indication information, and a channel index number/resource index number/frequency domain resource block index number corresponding to a D2D scheduling indication resource for bearing the D2D control indication information.

According to another aspect of the embodiment of the present document, the present document further provides user equipment, including: a processor configured to generate Device to Device (D2D) control indication information; and a sender coupled to the processor and configured to indicate a D2D data channel resource to another UE through D2D data channel resource indication information in the D2D control indication information and/or index information corresponding to the D2D control indication information, and send D2D communication data on the D2D data channel resource, herein the sender is further configured to perform at least one of the following: indicating a time domain resource and a frequency domain resource of the D2D data channel through the D2D data channel resource indication information; indicating a time domain resource of the D2D data channel through the D2D data channel resource indication information and indicating a frequency domain resource of the D2D data channel through the index information; indicating a frequency domain resource of the D2D data channel through the D2D data channel resource indication information and indicating a time domain resource of the D2D data channel through the index information; and indicating a time domain resource and a frequency domain resource of the D2D data channel through the index information.

Through the embodiment of the present document, by adopting the method of UE indicating a D2D data channel resource through D2D data channel resource indication information in D2D control indication information and/or index information corresponding to the D2D control indication information; and the UE sending D2D communication data on the D2D data channel resource, herein the UE indicating the D2D data channel resource through the D2D data channel resource indication information and/or the index information includes at least one of the following: the UE indicating a time domain resource and a frequency domain resource of the D2D data channel through the D2D data channel resource indication information; the UE indicating the time domain resource of the D2D data channel through the D2D data channel resource indication information and indicating the frequency domain resource of the D2D data channel through the index information; the UE indicating the frequency domain resource of the D2D data channel through the D2D data channel resource indication information and indicating the time domain resource of the D2D data channel through the index information; and the UE indicating the time domain resource and the frequency domain resource of the D2D data channel through the index information, the problem that transmitting UE for D2D communication is unable to indicate the used D2D data channel resource is solved, and the indication of the D2D data channel resource between D2D UE is realized.

BRIEF DESCRIPTION OF DRAWINGS

The drawings described here are used for providing further understanding about the present document and constitute a part of the present application. The exemplary embodiments and description thereof of the present document are used for explaining the present document instead of improperly limiting the present document. Among the drawings.

SPECIFIED EMBODIMENTS

In a D2D communication system, transmission of data is directly performed between UEs, and a transmitting UE needs to send D2D control information to indicate relevant information such as a resource used by the transmitted data signal to a receiving UE. Due to the specialty of D2D communication, the transmitting UE needs to indicate relevant control information of one or more D2D data subframes (i.e., data subframes used for sending D2D communication data) in D2D control information, especially the used D2D data channel resource.

Figure 5:
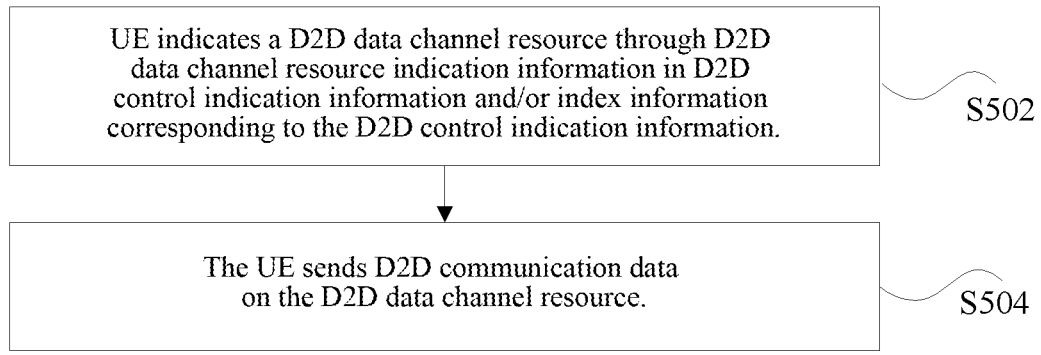
FIG. 5 illustrates a flowchart of a communication data sending method according to the embodiment of the present document.

In order to realize the above-mentioned purpose, the present document provides the following embodiment:

This embodiment provides a communication data sending method. FIG. 5 illustrates a flowchart of a communication data sending method according to the embodiment of the present document. As illustrated in FIG. 5, the process includes the following steps:

In step S502, UE indicates a D2D data channel resource through D2D data channel resource indication information in D2D control indication information and/or index information corresponding to the D2D control indication information.

In step S504, the UE sends D2D communication data on the D2D data channel resource.

Therein, step S502 includes at least one of the following:

1. the UE indicates a time domain resource and a frequency domain resource of the D2D data channel through the D2D data channel resource indication information;

2. the UE indicates the time domain resource of the D2D data channel through the D2D data channel resource indication information and indicates the frequency domain resource of the D2D data channel through the index information;

3. the UE indicates the frequency domain resource of the D2D data channel through the D2D data channel resource indication information and indicates the time domain resource of the D2D data channel through the index information; and 4. the UE indicates the time domain resource and the frequency domain resource of the D2D data channel through the index information.

Through the above-mentioned step, by adopting the D2D data channel resource indication information in the D2D control indication information and/or the index information corresponding to the D2D control indication information to indicate the D2D data channel resource, the problem that the transmitting UE for D2D communication is unable to indicate the used D2D data channel resource is solved, and the indication of the D2D data channel resource between D2D UEs and the transmission of the D2D data are realized.

The steps illustrated in the flowchart of the drawing may be executed in, for example, a computer system having a group of computer-executable instructions. In addition, although a logic sequence is illustrated in the flowchart, under certain circumstances, the illustrated or described steps may be executed in a sequence different from the sequence here.

Step S502 may realize flexible allocation of the time domain/frequency domain resource.

Alternatively, the D2D control indication information is used for indicating control information related to the transmission of the D2D communication data, herein the D2D data channel resource indication information carried in the D2D control indication information is used for indicating the D2D data channel resource for bearing the D2D communication data.

Alternatively, the D2D data channel resource indication information includes indication information for indicating the time domain resource of the D2D data channel and/or indication information for indicating the frequency domain resource of the D2D data channel.

Alternatively, the channel resource for bearing the D2D control indication information may be flexibly configured and selected according to an actual situation, e.g., the D2D control indication information is born on one of resources as follows: D2D control channel resource, D2D data channel resource and D2D scheduling indication resource.

I. Indicate Time Domain and Frequency Domain Resources Through D2D Data Channel Resource Indication Information Alternatively, the D2D data channel resource indication information may be sent through a partial extended field in a D2D message or by adopting a new D2D message, e.g., the D2D data channel resource indication information is contained in the D2D control indication information and the time domain resource and the frequency domain resource of the D2D data channel are indicated through indication information of N bits, herein N is a positive integer.

Alternatively, in a specific implementation process, under the situation that the D2D data channel resource indication information indicates the time domain resource and the frequency domain resource of the D2D data channel through the indication information of N bits, step S502 may further include: indicating the time domain resource of the D2D data channel through indication information of N1 bits, and indicating the frequency domain resource of the D2D data channel through indication information of N2 bits, herein N1+N2=N; or indicating the time domain resource and the frequency domain resource of the D2D data channel through the indication information of N bits according to a predefined corresponding relation between indication information of N bits and a resource pattern of the D2D data channel.

Alternatively, the corresponding relation between the indication information of N bits and the resource pattern of the D2D data channel includes: each predefined value of indication information of N bits corresponding to a fixed resource pattern of the D2D data channel, herein the resource pattern contains one or more fixed D2D data subframes used for sending the D2D communication data and one or more fixed Resource Blocks (RBs) on each D2D data sub frame.

II. Indicate Time Domain Resource Through D2D Data Channel Resource Indication Information Alternatively, under the situation that the D2D data channel resource indication information indicates the time domain resource of the D2D data channel through indication information of N bits or N1 bits, step S502 may further include: indicating the time domain resource of the D2D data channel through the indication information of N bits or N1 bits by a way of a bitmap, herein the time domain resource of the D2D data channel refers to one or more D2D data subframes contained by the D2D data channel in a time domain and used for sending the D2D communication data; or indicating the time domain resource of the D2D data channel through the indication information of N bits or N1 bits by a way of a timing pattern, herein the time domain resource of the D2D data channel refers to one or more D2D data subframes contained by the D2D data channel in a time domain and used for sending the D2D communication data.

Alternatively, under the situation that the time domain resource of the D2D data channel is indicated through the indication information of N bits or N1 bits by a way of the bitmap, the indication information of N bits or N1 bits corresponds to N or N1 D2D data subframes, and step S502 may further include: under the situation that a bit in the bitmap is indicated to be "1", indicating that the corresponding D2D data subframe is the time domain resource of the D2D data channel, and under the situation that the bit in the bitmap is indicated to be "0", indicating that the corresponding D2D data subframe is not the time domain resource of the D2D data channel; or under the situation that the bit in the bitmap is indicated to be "0", indicating that the corresponding D2D data subframe is the time domain resource of the D2D data channel, and under the situation that the bit in the bitmap is indicated to be "1", indicating that the corresponding D2D data subframe is not the time domain resource of the D2D data channel.

Alternatively, under the situation that the time domain resource of the D2D data channel is indicated through the indication information of N bits or N1 bits by a way of the timing pattern, step S502 further includes: indicating the one or more D2D data subframes contained by the D2D data channel in the time domain through indication information of N bits or N1 bits according to a predefined corresponding relation between indication information of N bits or N1 bits and the timing pattern.

Alternatively, the predefined corresponding relation between the indication information of N bits or N1 bits and the timing pattern includes: each predefined value of indication information of N bits or N1 bits corresponding to a fixed timing pattern of the D2D data subframe, herein the timing pattern contains one or more fixed D2D data subframes.

III. Indicate Frequency Domain Resource Through D2D Data Channel Resource Indication Information Alternatively, under the situation that the D2D data channel resource indication information indicates the frequency domain resource of the D2D data channel through indication information of N bits or N2 bits, step S502 further includes: indicating one or more RBs contained by the D2D data channel in the frequency domain through the indication information of N bits or N2 bits in a resource allocation indication type 0 or a resource allocation indication type 1.

Alternatively, under the situation that the D2D data channel resource indication information indicates the frequency domain resource of the D2D data channel through indication information of N bits or N2 bits, step S502 further includes: indicating one or more RBs contained by the D2D data channel in the frequency domain through indication information of N bits or N2 bits according to a predefined corresponding relation between indication information of N bits or N2 bits and a frequency pattern.

Alternatively, the predefined corresponding relation between the indication information of N bits or N2 bits and the frequency pattern includes: each predefined value of indication information of N bits or N2 bits corresponding to a fixed frequency pattern, herein the frequency pattern contains one or more fixed RBs.

Alternatively, the indication information of N bits or N2 bits is further used for indicating whether to perform frequency hopping on the frequency domain resource of the D2D data channel and a mode for performing the frequency hopping.

IV. Indicate Time Domain Resource Through Index Information

Alternatively, under the situation that the allocation of the time domain resource of the D2D data channel is indicated through the index information, step S502 further includes: indicating one or more D2D data subframes contained by the D2D data channel in the time domain and used for sending the D2D communication data according to a predefined corresponding relation between the index information and a timing pattern.

Alternatively, the predefined corresponding relation between the index information and the timing pattern includes: each predefined value of index information corresponding to a fixed timing pattern of the D2D data subframes, herein the timing pattern contains one or more fixed D2D data subframes.

V. Indicate Frequency Domain Resource Through Index Information

Alternatively, under the situation that the frequency domain resource of the D2D data channel is indicated through the index information, step S502 further includes: indicating one or more RBs contained by the D2D data channel in the time domain according to a predefined corresponding relation between the index information and a frequency pattern.

Alternatively, the predefined corresponding relation between the index information and the frequency pattern includes: each predefined value of index information corresponding to a fixed frequency pattern, herein the frequency pattern contains one or more fixed RBs.

VI. Indicate Time Domain and Frequency Domain Resources Through Index Information Alternatively, under the situation that the time domain resource and the frequency domain resource of the D2D data channel are indicated through the index information, step S502 further includes: indicating the time domain and frequency domain resources of the D2D data channel according to a predefined corresponding relation between the index information and a resource pattern of the D2D data channel.

Alternatively, the predefined corresponding relation between the index information and the resource pattern of the D2D data channel includes: each predefined value of index information corresponding to a fixed resource pattern of the D2D data channel, herein the resource pattern contains one or more fixed D2D data subframes used for sending the D2D communication data and one or more fixed RBs on each D2D data subframe.

Alternatively, the index information includes at least one of the following: a channel index number/resource index number/frequency domain resource block index number corresponding to a D2D control channel resource for bearing the D2D control indication information, a channel index number/resource index number/frequency domain resource block index number corresponding to a D2D data channel resource for bearing the D2D control indication information, and a channel index number/resource index number/frequency domain resource block index number corresponding to a D2D scheduling indication resource for bearing the D2D control indication information.

This embodiment further provides a communication data sending device, located in User Equipment (UE) and used for implementing the above mentioned communication data sending method. The specific implementation process of the communication data sending device described in the device embodiment has already been described in detail in the method embodiment and thus is not repetitively described here.

Figure 6:
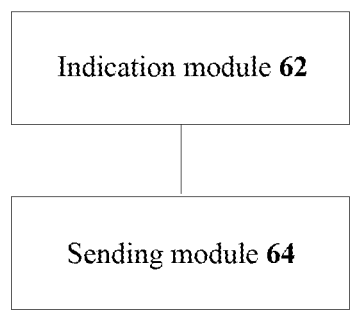
FIG. 6 illustrates a structural schematic diagram of a communication data sending device according to the embodiment of the present document.

FIG. 6 illustrates a structural schematic diagram of a communication data sending device according to the embodiment of the present document. As illustrated in FIG. 6, the device includes an indication module 62 and a sending module 64, herein the indication module 62 is configured to indicate a D2D data channel resource through D2D data channel resource indication information in D2D control indication information and/or index information corresponding to the D2D control indication information; and the sending module 64 is coupled to the indication module 62 and is configured to send D2D communication data on the D2D data channel resource.

Therein, the indication module is configured to perform at least one of the following: indicating a time domain resource and a frequency domain resource of the D2D data channel through the D2D data channel resource indication information; indicating the time domain resource of the D2D data channel through the D2D data channel resource indication information and indicating the frequency domain resource of the D2D data channel through the index information; indicating the frequency domain resource of the D2D data channel through the D2D data channel resource indication information and indicating the time domain resource of the D2D data channel through the index information; and indicating the time domain resource and the frequency domain resource of the D2D data channel through the index information.

The modules and units involved in the embodiment of the present document may be implemented by a way of software and may also be implemented by a way of hardware. The modules and units described in this embodiment may also be configured in a processor, e.g., it may be described as: a processor including an indication module 62 and a sending module 64. Therein, the names of these modules do not constitute limitations on the modules themselves under a certain circumstance, e.g., the indication module 62 may also be described as "configured as a module for indicating a D2D data channel resource through D2D data channel resource indication information in D2D control indication information and/or index information corresponding to the D2D control indication information".

Alternatively, the D2D control indication information is used for indicating control information related to the transmission of the D2D communication data, herein the D2D data channel resource indication information carried in the D2D control indication information is used for indicating the D2D data channel resource for bearing the D2D communication data.

Alternatively, the D2D data channel resource indication information includes indication information for indicating the time domain resource of the D2D data channel and/or indication information for indicating the frequency domain resource of the D2D data channel.

Alternatively, the indication module 62 is further configured to bear the D2D control indication information on one of the following resources as follows for sending: D2D control channel resource, D2D data channel resource and D2D scheduling indication resource.

I. Indicate Time Domain and Frequency Domain Resources Through D2D Data Channel Resource Indication Information Alternatively, the indication module 62 is further configured to generate the D2D control indication information, herein the D2D data channel resource indication information is contained in the D2D control indication information and indicates the time domain resource and/or the frequency domain resource of the D2D data channel through indication information of N bits.

Alternatively, under the situation that the D2D data channel resource indication information indicates the time domain resource and the frequency domain resource of the D2D data channel through the indication information of N bits, the indication module 62 is further configured to: indicate the time domain resource of the D2D data channel through indication information of N1 bits, and indicate the frequency domain resource of the D2D data channel through indication information of N2 bits, herein N1+N2=N; or indicate the time domain resource and the frequency domain resource of the D2D data channel through the indication information of N bits according to a predefined corresponding relation between indication information of N bits and a resource pattern of the D2D data channel.

Alternatively, the predefined corresponding relation between the indication information of N bits and the resource pattern of the D2D data channel includes: each predefined value of indication information of N bits corresponding to a fixed resource pattern of the D2D data channel, herein the resource pattern contains one or more fixed D2D data subframes used for sending the D2D communication data and one or more fixed Resource Blocks RBs on each D2D data subframe.

II. Indicate Time Domain Resource Through D2D Data Channel Resource Indication Information Alternatively, under the situation that the D2D data channel resource indication information indicates the time domain resource of the D2D data channel through indication information of N bits or N1 bits, the indication module 62 is further configured to: indicate the time domain resource of the D2D data channel through the indication information of N bits or N1 bits by a way of a bitmap, herein the time domain resource of the D2D data channel refers to one or more D2D data subframes contained by the D2D data channel in a time domain and used for sending the D2D communication data; or indicate the time domain resource of the D2D data channel through the indication information of N bits or N1 bits by a way of a timing pattern, herein the time domain resource of the D2D data channel refers to one or more D2D data subframes contained by the D2D data channel in a time domain and used for sending the D2D communication data.

Alternatively, under the situation that the time domain resource of the D2D data channel is indicated through the indication information of N bits or N1 bits by a way of the bitmap, the indication information of N bits or N1 bits corresponds to N or N1 D2D data subframes, and the indication module 62 is further configured to: under the situation that a bit in the bitmap is indicated to be "1", indicate that the corresponding D2D data subframe is the time domain resource of the D2D data channel, and under the situation that the bit in the bitmap is indicated to be "0", indicate that the corresponding D2D data subframe is not the time domain resource of the D2D data channel; or under the situation that the bit in the bitmap is indicated to be "0", indicate that the corresponding D2D data subframe is the time domain resource of the D2D data channel, and under the situation that the bit in the bitmap is indicated to be "1", indicate that the corresponding D2D data subframe is not the time domain resource of the D2D data channel.

Alternatively, under the situation that the time domain resource of the D2D data channel is indicated through the indication information of N bits or N1 bits by a way of the timing pattern, the indication module 62 is further configured to: indicate the one or more D2D data subframes contained by the D2D data channel in the time domain through indication information of N bits or N1 bits according to a predefined corresponding relation between indication information of N bits or N1 bits and the timing pattern.

Alternatively, the predefined corresponding relation between the indication information of N bits or N1 bits and the timing pattern includes: each predefined value of indication information of N bits or N1 bits corresponding to a fixed timing pattern of the D2D data subframes, herein the timing pattern contains one or more fixed D2D data subframes.

III. Indicate Frequency Domain Resource Through D2D Data Channel Resource Indication Information Alternatively, under the situation that the D2D data channel resource indication information indicates the frequency domain resource of the D2D data channel through indication information of N bits or N2 bits, the indication module 62 is further configured to: indicate one or more RBs contained by the D2D data channel in the frequency domain through the indication information of N bits or N2 bits in a resource allocation indication type 0 or a resource allocation indication type 1.

Alternatively, under the situation that the D2D data channel resource indication information indicates the frequency domain resource of the D2D data channel through indication information of N bits or N2 bits, the indication module 62 is further configured to: indicate one or more RBs contained by the D2D data channel in the frequency domain through indication information of N bits or N2 bits according to a predefined corresponding relation between indication information of N bits or N2 bits and a frequency pattern.

Alternatively, the predefined corresponding relation between the indication information of N bits or N2 bits and the frequency pattern includes: each predefined value of indication information of N bits or N2 bits corresponding to a fixed frequency pattern, herein the frequency pattern contains one or more fixed RBs.

Alternatively, the indication module 62 is further configured to indicate whether to perform frequency hopping on the frequency domain resource of the D2D data channel and a mode for performing the frequency hopping through the indication information of N bits or N2 bits.

IV. Indicate Time Domain Resource Through Index Information

Alternatively, under the situation that the allocation of the time domain resource of the D2D data channel is indicated through the index information, the indication module 62 is further configured to: indicate one or more D2D data subframes contained by the D2D data channel in the time domain and used for sending the D2D communication data according to a predefined corresponding relation between the index information and a timing pattern.

Alternatively, the predefined corresponding relation between the index information and the timing patterns includes: each predefined value of index information corresponding to a fixed timing pattern of the D2D data subframes, herein the timing pattern contains one or more fixed D2D data subframes.

V. Indicate Frequency Domain Resource Through Index Information

Alternatively, under the situation that the frequency domain resource of the D2D data channel is indicated through the index information, the indication module 62 is further configured to: indicate one or more RBs contained by the D2D data channel in the time domain according to a predefined corresponding relation between the index information and a frequency pattern.

Alternatively, the predefined corresponding relation between the index information and the frequency pattern includes: each predefined value of index information corresponding to a fixed frequency pattern, herein the frequency pattern contains one or more fixed RBs.

VI. Indicate Time Domain and Frequency Domain Resources Through Index Information Alternatively, under the situation that the time domain resource and the frequency domain resource of the D2D data channel are indicated through the index information, the indication module 62 is further configured to: indicate the time domain and frequency domain resources of the D2D data channel according to a predefined corresponding relation between the index information and a resource pattern of the D2D data channel.

Alternatively, the predefined corresponding relation between the index information and the resource pattern of the D2D data channel includes: each predefined value of index information corresponding to a fixed resource pattern of the D2D data channel, herein the resource pattern contains one or more fixed D2D data subframes used for sending the D2D communication data and one or more fixed RBs on each D2D data subframe.

Alternatively, the index information includes at least one of the following: a channel index number/resource index number/frequency domain resource block index number corresponding to a D2D control channel resource for bearing the D2D control indication information, a channel index number/resource index number/frequency domain resource block index number corresponding to a D2D data channel resource for bearing the D2D control indication information, and a channel index number/resource index number/frequency domain resource block index number corresponding to a D2D scheduling indication resource for bearing the D2D control indication information.

This embodiment further provides user equipment, herein the user equipment includes the above communication data sending device.

Figure 7:
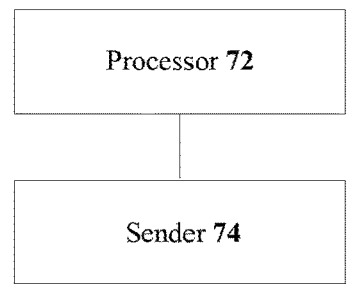
FIG. 7 is a structural schematic diagram 1 of user equipment according to the embodiment of the present document.

This embodiment further provides user equipment, herein the user equipment is used for implementing the above communication data sending method. FIG. 7 is a structural schematic diagram 1 of user equipment according to the embodiment of the present document. As illustrated in FIG. 7, the user equipment includes a processor 72 and a sender 74, herein the processor 72 is configured to generate D2D control indication information; and the sender 74 is coupled to the processor 72 and is configured to indicate a D2D data channel resource to another UE through D2D data channel resource indication information in the D2D control indication information and/or index information corresponding to the D2D control indication information, and send D2D communication data on the D2D data channel resource.

Therein, the sender is further configured to perform at least one of the following: indicating a time domain resource and a frequency domain resource of the D2D data channel through the D2D data channel resource indication information; indicating the time domain resource of the D2D data channel through the D2D data channel resource indication information and indicating the frequency domain resource of the D2D data channel through the index information; indicating the frequency domain resource of the D2D data channel through the D2D data channel resource indication information and indicating the time domain resource of the D2D data channel through the index information; and indicating the time domain resource and the frequency domain resource of the D2D data channel through the index information.

Description will be made below in combination with the preferred embodiment.

This preferred embodiment provides a resource indication method and device, so as to indicate a D2D data channel resource through D2D data channel resource indication information in D2D control indication information and/or index information corresponding to the D2D control indication information, provide high-efficiency and flexible resource indication, reduce indication signaling overhead and improve the utilization rate of resources.

In order to achieve the purposes, the resource indication method provided by this preferred embodiment includes that:

UE indicates a D2D data channel resource through D2D data channel resource indication information in D2D control indication information and/or index information corresponding to the D2D control indication information, and sends D2D communication data on the indicated D2D data channel resource.

In the method, a mode of indicating the D2D data channel resource includes one of the following:

1. indicating the allocation of a time domain resource and a frequency domain resource of the D2D data channel through the D2D data channel resource indication information;

2. indicating the allocation of the time domain resource of the D2D data channel through the D2D data channel resource indication information and indicating the allocation of the frequency domain resource of the D2D data channel through the index information;

3. indicating the allocation of the frequency domain resource of the D2D data channel through the D2D data channel resource indication information and indicating the allocation of the time domain resource of the D2D data channel through the index information; and 4. indicating the allocation of the time domain resource and the frequency domain resource of the D2D data channel through the index information.

Alternatively, the D2D control indication information is used for indicating control information related to the transmission of the D2D communication data, herein the D2D control indication information includes the indication of the D2D data channel resource for bearing the D2D communication data, and further, the indication of the D2D data channel resource includes the indication of the time domain resource and the frequency domain resource.

Alternatively, the D2D control indication information is born on a D2D control channel resource, a D2D data channel resource and a D2D scheduling indication resource.

Methods for indicating the time domain/frequency domain resource through the D2D data channel resource indication information will be described below.

Alternatively, the D2D data channel resource indication information is contained in the control indication information and indicates the allocation of the time domain resource and/or the frequency domain resource of the D2D data channel through indication information of N bits.

Alternatively, when the D2D data channel resource indication information indicates the time domain resource and the frequency domain resource of the D2D data channel through the indication information of N bits, the allocation of the time domain resource is indicated through indication information of N1 bits and the allocation of the frequency domain resource is indicated through indication information of N2 bits, herein N1+N2=N; or the time domain and frequency domain resources contained by the D2D data channel resource are indicated through indication information of N bits according to a predefined corresponding relation between indication information of N bits and a resource pattern of the D2D data channel.

Alternatively, the predefined corresponding relation between the indication information of N bits and the resource pattern of the D2D data channel refers to each predefined value of indication information of N bits corresponding to a fixed resource pattern of the D2D data channel, herein the resource pattern contains one or more fixed D2D data subframes (i.e., data subframes for sending D2D communication data) and one or more fixed RBs on each contained D2D data subframe.

Alternatively, when the D2D data channel resource indication information indicates the time domain resource of the D2D data channel through indication information of N bits or N1 bits, one or more D2D communication data subframes contained by the D2D data channel in a time domain are indicated through the indication information of N bits or N1 bits by a way of a bitmap, or one or more D2D communication data subframes contained by the D2D data channel in a time domain are indicated through the indication information of N bits or N1 bits by a way of a timing pattern.

Alternatively, when the one or more D2D communication data subframes contained by the D2D data channel in the time domain are indicated through the indication information of N bits or N1 bits by a way of the bitmap, the indication information of N bits or N1 bits corresponds to N or N1 D2D communication data subframes, when a bit is indicated to be "1", it indicates that the corresponding D2D communication data subframe is the time domain resource of the D2D data channel, and when the bit is indicated to be "0", it indicates that the corresponding D2D communication data subframe is not the time domain resource of the D2D data channel; or when the bit is indicated to be "0", it indicates that the corresponding D2D communication data subframe is the time domain resource of the D2D data channel, and when the bit is indicated to be "1", it indicates that the corresponding D2D communication data subframe is not the time domain resource of the D2D data channel.

Alternatively, when the time domain resource of the D2D data channel is indicated through the indication information of N bits or N1 bits by a way of the timing pattern, the one or more D2D data subframes contained by the D2D data channel in the time domain are indicated through indication information of N bits or N1 bits according to a predefined corresponding relation between indication information of N bits or N1 bits and the timing pattern, herein the predefined corresponding relation between the indication information of N bits or N1 bits and the timing pattern refers to each predefined value of indication information of N bits or N1 bits corresponding to a fixed timing pattern of the D2D data subframes, herein the timing pattern contains one or more fixed D2D communication data subframes.

Alternatively, when the D2D data channel resource indication information indicates the frequency domain resource of the D2D data channel through indication information of N bits or N2 bits, one or more RBs contained by the D2D data channel in the frequency domain are indicated through the indication information of N bits or N2 bits in a resource allocation indication type 0 or a resource allocation indication type 1.

Alternatively, when the D2D data channel resource indication information indicates the frequency domain resource of the D2D data channel through indication information of N bits or N2 bits, one or more RBs contained by the D2D data channel in the frequency domain are indicated according to a predefined corresponding relation between indication information of N bits or N2 bits and a frequency pattern, herein the predefined corresponding relation between the indication information of N bits or N2 bits and the frequency pattern refers to each predefined value of indication information of N bits or N2 bits corresponding to a fixed frequency pattern, herein the frequency pattern contains one or more fixed RBs.

Alternatively, the indication information of N bits or N2 bits is further used for indicating whether to perform frequency hopping on the frequency domain resource of the D2D data channel and a mode for performing the frequency hopping.

A method of indicating a time domain resource and/or a frequency domain resource through index information will be described below. This method is an implicit indication method and no information field needs to be occupied.

Alternatively, when the allocation of the time domain resource of the data channel is indicated through the index information, one or more D2D data subframes contained by the D2D data channel in the time domain are indicated according to a predefined corresponding relation between the index information and a timing pattern, herein the predefined corresponding relation between the index information and the timing pattern refers to each predefined value of index information corresponding to a fixed timing pattern, herein the timing pattern contains one or more fixed D2D data subframes.

Alternatively, when the allocation of the frequency domain resource of the data channel is indicated through the index information, one or more RBs contained by the D2D data channel in the time domain are indicated according to a predefined corresponding relation between the index information and a frequency pattern, herein the predefined corresponding relation between the index information and the frequency pattern refers to each predefined value of index information corresponding to a fixed frequency pattern, herein the frequency pattern contains one or more fixed RBs.

Alternatively, when the allocation of the time domain resource and the frequency domain resource of the data channel are indicated through the index information, the time domain and frequency domain resources of the D2D data channel are indicated according to a predefined corresponding relation between the index information and a resource pattern of the D2D data channel, herein the predefined corresponding relation between the index information and the resource pattern of the D2D data channel refers to each predefined value of index information corresponding to a fixed resource pattern of the D2D data channel, herein the resource pattern contains one or more fixed D2D data subframes and one or more fixed RBs on each subframe.

Alternatively, the index information refers to a channel index number, a resource index number or a frequency domain resource block index number corresponding to a D2D control channel resource, a D2D data channel resource or a D2D scheduling indication resource for bearing the D2D control indication information.

It needs to be stated that the embodiments in the present application and the features in the embodiments may be mutually combined under the situation of no conflict. The present document will be further described below in detail with reference to the drawings in combination with the embodiments.

In a D2D communication system, a D2D transmitting UE having D2D data to be sent may obtain data channel resource allocation for D2D communication from an eNB, or select some data channel resources for use from a system predefined resource pool. No matter how the transmitting UE obtains the D2D data channel resource, the transmitting UE needs to indicate to a receiving UE the used D2D data channel resource and other control information such as a Modulation and Coding Scheme (MCS) and a User Equipment Identification (UE ID) related to the transmission of D2D data through D2D control indication information, and thus the D2D control indication information may also be called as Scheduling Assignment (SA) information.

Resources for D2D communication may include one or more of the following: D2D data channels, D2D control channels, D2D discovery channels, D2D SA resources, D2D synchronizing channels, D2D shared channels, etc. Therein, the transmitting UE may send the D2D control indication information on the D2D control channels, the D2D data channels or the D2D SA resources. Description will be made below by taking that the D2D control indication information is born on the SA resources as an example. Solutions under other situations may be similarly obtained.

Figure 8:
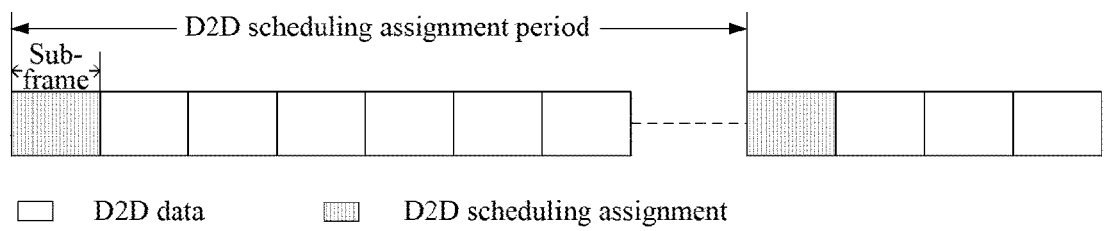
FIG. 8 illustrates a structural schematic diagram of a control indication information resource and a D2D data channel resource in a D2D communication system according to the preferred embodiment of the present document.

Supposing that the SA resource shares the D2D data channel resource and is divided into SA subframes and data subframes by taking a subframe as a unit, D2D control indication information is born on the SA subframes and D2D data are born on the data subframes. D2D control indication information of a plurality of transmitting UEs may be born on each SA subframe, and the D2D control indication information of each UE may indicate D2D data channel resource allocation and relevant information on one or more data subframes thereafter. Here, a time period between two times of effective D2D control indication information transmission (excluding repeating) is defined as a D2D control indication period (i.e., D2D scheduling assignment period), and the D2D control indication information may indicate the D2D data channel resource on all D2D data subframes in one D2D control indication period, as illustrated in FIG. 8. It needs to be noted that the relation illustrated in FIG. 8 that the SA subframe and the D2D data subframe are adjacent and continuous is a logic relation. In an actual system, the SA subframe and the D2D data subframe may be temporally discrete, herein other D2D communication non-related subframes may exist. All examples and drawings in the present document are described based on this and no repetitive description is made.

The transmitting UE indicates corresponding D2D data channel resource allocation to one or more receiving UEs through the D2D control indication information, such that after the D2D control indication information is received, the receiving UE can obtain D2D data channel resource indication and receive the needed data on the corresponding D2D data channel resource according to the indication.

Based on the D2D data channel resource indication information in the D2D control indication information and/or the index information corresponding to the D2D control indication information, the transmitting UE may flexibly indicate the corresponding D2D data channel resource, including time domain and frequency domain resources. Specifically, there are four methods as follows.

Method 1

The corresponding D2D data channel resource is indicated through D2D data channel resource indication information in D2D control indication information.

The D2D data channel resource indication information is indication information of N bits contained in the D2D control indication information and is used for indicating time domain and frequency domain resources of the corresponding D2D data channel. Further, when the time domain and frequency domain resources of the D2D data channel are indicated through the indication information of N bits, there are two modes as follows:

Mode 1: the indication information of N bits is divided into two parts, indication information of N1 bits is used for indicating a time domain resource of the corresponding D2D data channel and indication information of N2 bits is used for indicating a frequency domain resource of the corresponding D2D data channel, N1+N2=N.

When the time domain resource of the D2D data channel is indicated through the indication information of N1 bits, there are two indication methods, i.e., bitmap indication and timing pattern indication.

When bitmap indication is performed on the time domain resource through indication information of N1 bits, i.e., N1 bits correspond to N1 D2D data subframes, indication information of each bit indicates whether the corresponding D2D data subframe is the time domain resource of the D2D data channel of the transmitting UE.

When timing pattern indication is performed on the time domain resource through indication information of N1 bits, a corresponding relation between each indication value of N1 bits and a corresponding timing pattern is predefined, such that indication information of N1 bits can uniquely correspond to one timing pattern, herein each timing pattern indicates one or more fixed D2D data subframes.

When the frequency domain resource of the D2D data channel is indicated through indication information of N2 bits, there are two indication methods, i.e., indicating the frequency domain resource of the corresponding D2D data channel in a resource allocation indication type 1 and a resource allocation indication type 0 of uplink resources by an LTE system, and indicating a frequency pattern.

Therein, when the frequency pattern is indicated through indication information of N2 bits, a corresponding relation between each indication value of N2 bits and a corresponding frequency pattern is predefined, such that indication information of N2 bits can uniquely correspond to one frequency pattern, herein each frequency pattern indicates one or more fixed RBs.

Further, the indication information of N2 bits may also indicate whether to perform frequency hopping on the corresponding D2D data channel frequency domain resource and indicate a used frequency hopping mode.

Mode 2: Indication information of N bits comprehensively indicates the time domain and frequency domain resources of the corresponding D2D data channel, i.e., the D2D data channel resource pattern is indicated through the indication information of N bits, and a corresponding relation between each indication value of N bits and a corresponding resource pattern is predefined, such that the indication information of N bits can uniquely correspond to one resource pattern, herein each resource pattern indicates one or more fixed D2D data subframes and corresponding one or more fixed RBs on each D2D data subframe.

Method 2

The time domain resource of the corresponding D2D data channel is indicated through the D2D data channel resource indication information in the D2D control indication information, and the frequency domain resource of the D2D data channel is implicitly indicated through index information corresponding to the D2D control indication information.

The D2D data channel resource indication information is indication information of N bits contained in the D2D control indication information and is used for indicating the time domain resource of the corresponding D2D data channel. Further, when the time domain resource of the D2D data channel is indicated through the indication information of N bits, there are two methods, i.e., bitmap indication and timing pattern indication.

When bitmap indication is performed on the time domain resource through indication information of N bits, i.e., N bits correspond to N D2D data subframes, indication information of each bit indicates whether the corresponding D2D data subframe is the time domain resource of the D2D data channel of the transmitting UE.

When timing pattern indication is performed on the time domain resource through indication information of N bits, a corresponding relation between each indication value of N bits and a corresponding timing pattern is predefined, such that indication information of N bits can uniquely correspond to one timing pattern, herein each timing pattern indicates one or more fixed D2D data subframes.

The index information corresponding to the D2D control indication information is related to the resource for bearing the D2D control indication information, the D2D control indication information may be born on a D2D control channel, a D2D data channel or a D2D SA resource, and the index information refers to a channel index number, a resource index number or a frequency domain RB index number of the channel or resource for bearing corresponding D2D control indication information. Therefore, the index information is determined by the resource for bearing D2D control indication information. When the time domain and/or frequency domain resource of the D2D data channel is indicated through the index information, information overhead does not need to be explicitly indicated, and the time domain and/or frequency domain resource may be directly indicated through the index information according to a corresponding predefined rule.

When the frequency domain resource of the D2D data channel is implicitly indicated through the index information corresponding to the D2D control indication information, a corresponding relation between the index information and a corresponding frequency pattern is predefined, such that each index information value can uniquely correspond to one frequency pattern, herein each frequency pattern indicates one or more fixed RBs.

Method 3

The frequency domain resource of the corresponding D2D data channel is indicated through the D2D data channel resource indication information in the D2D control indication information, and the time domain resource of the D2D data channel is implicitly indicated through the index information corresponding to the D2D control indication information.

The D2D data channel resource indication information is indication information of N bits contained in the D2D control indication information and is used for indicating the frequency domain resource of the corresponding D2D data channel. When the frequency domain resource of the D2D data channel is indicated through the indication information of N bits, there are two methods: indicating the frequency domain resource of the corresponding D2D data channel in a resource allocation indication type 1 and a resource allocation indication type 0 of uplink resources by an LTE system, and indicating a frequency pattern.

When the frequency pattern is indicated through indication information of N bits, a corresponding relation between each indication value of N bits and a corresponding frequency pattern is predefined, such that indication information of N bits can uniquely correspond to one frequency pattern, herein each frequency pattern indicates one or more fixed RBs.

Further, the indication information of N bits may also indicate whether to perform frequency hopping on the corresponding D2D data channel frequency domain resource and indicate a used frequency hopping mode.

When the time domain resource of the D2D data channel is implicitly indicated through the index information corresponding to the D2D control indication information, a corresponding relation between the index information and a corresponding timing pattern is predefined, such that each index information value can uniquely correspond to one timing pattern, herein each timing pattern indicates one or more fixed D2D data frames.

Method 4

The time domain and frequency domain resources of the D2D data channel are implicitly indicated through the index information corresponding to the D2D control indication information.

When the time domain and frequency domain resources of the D2D data channel are implicitly indicated through the index information corresponding to the D2D control indication information, a corresponding relation between the index information and a corresponding resource pattern is predefined, such that each index information value can uniquely correspond to one resource pattern, herein each resource pattern indicates one or more fixed D2D data subframes and one or more fixed RBs on each corresponding D2D data subframe.

Description will be made below based on the four methods.

Example 1

As described in method 1 and method 2, when bitmap indication is performed on the time domain resource through the N bits or N1 bits, the N/N1bits correspond to N/N1 D2D data subframes, and indication information of each bit indicates whether the corresponding D2D data subframe is the time domain resource of the D2D data channel of the transmitting UE. When a bit is indicated to be "1", it indicates that the corresponding D2D data subframe is the time domain resource of the D2D data channel, and when the bit is indicated to be "0", it indicates that the corresponding D2D data subframe is not the time domain resource of the D2D data channel; or when the bit is indicated to be "0", it indicates that the corresponding D2D data subframe is the time domain resource of the D2D data channel, and when the bit is indicated to be "1", it indicates that the corresponding D2D data subframe is not the time domain resource of the D2D data channel.

By taking that the bit indicated to be "1"/"0" indicates that the corresponding D2D data subframe is/is not the time domain resource of the corresponding D2D data channel as an example, supposing N=8, when the indication information of N bits is "1111 000", it indicates that, in the eight D2D data subframes in the next D2D control indication period, the first four subframes are the time domain resource of the D2D data channel of the transmitting UE and last four subframes are not the time domain resource of the D2D data channel of the transmitting UE.

When the time domain resource of the D2D data channel is indicated through D2D data channel resource indication information of N bits or N1 bits by a way of a timing pattern, a corresponding relation between N/N1 bits and the timing pattern needs to be predefined.

The number of the D2D data subframes contained by the timing pattern indicated by N/N1 bits depends on the D2D control indication period, i.e., all D2D data subframes in an interval between two times of effective transmission of control indication information.

Figure 9:
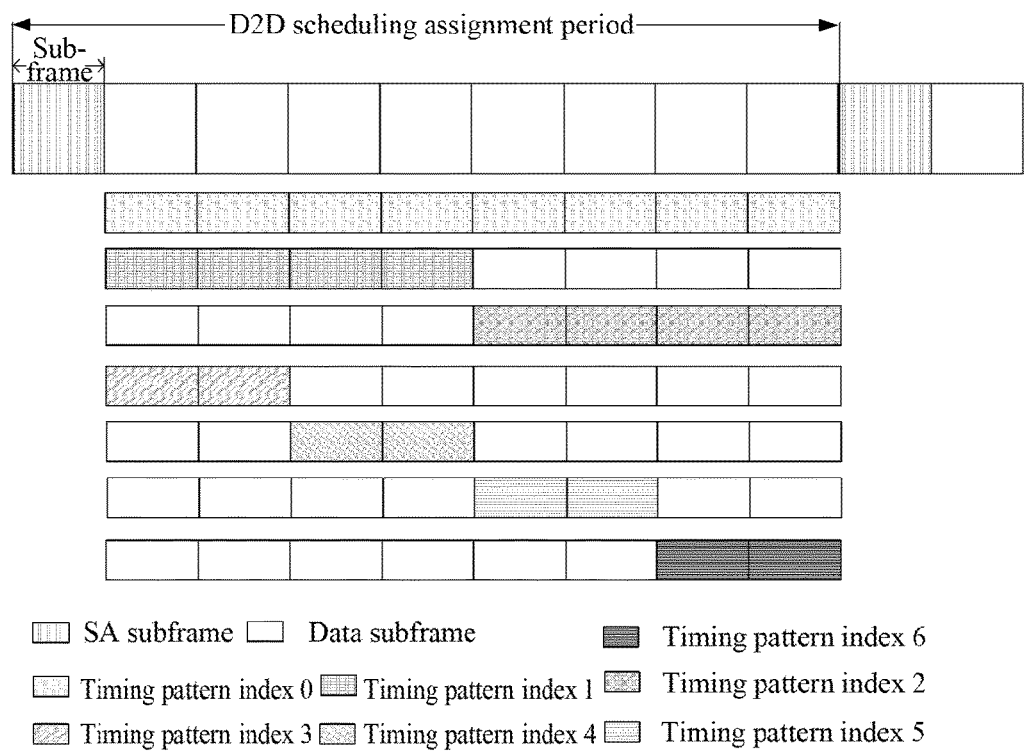
FIG. 9 illustrates a structural schematic diagram of a D2D data channel resource according to example 1 of the present document.

By taking N/N1=3 as an example and taking that eight D2D data subframes are contained in the D2D control indication period as an example, a corresponding relation, which can be predefined, between each indication value of indication information of N/N1 bits and a corresponding D2D data subframe timing pattern is as shown in Table 1. Based on this predefined relation, UE may determine the allocation of the time domain resource of the corresponding D2D data channel according to the indication in the D2D data channel resource indication information. As illustrated in FIG. 9, when the D2D data channel resource indication information in the D2D control indication information of UE 1 is "001", it indicates that a timing pattern index #1 is adopted, i.e., the first four subframes in the control indication period are used, and when the D2D data channel resource indication information in the D2D control indication information of UE 2 is "101", it indicates that a timing pattern index #5 is adopted, i.e., the fifth and sixth subframes in the control indication period are used.

TABLE 1

| Indication information of N/N1 bits | Timing pattern index | D2D data subframe |
|---|---|---|
| 000 | 0 | 1111 1111 |
| 001 | 1 | 1111 0000 |
| 010 | 2 | 0000 1111 |
| 011 | 3 | 1100 0000 |
| 100 | 4 | 0011 0000 |
| 101 | 5 | 0000 1100 |
| 110 | 6 | 0000 0011 |
| 111 | 7 | Reserved |

Example 2

As described in method 1 and method 2, when the frequency domain resource of the D2D data channel is indicated through N bits or N2 bits by a way of a frequency pattern, a corresponding relation between N/N2 bits and a frequency pattern needs to be predefined.

A range of frequency domain RBs contained by the frequency pattern indicated by N/N2 bits depends on available frequency domain bandwidth of the D2D data channel, i.e., all RBs on available bandwidth of the D2D data channel.

Figure 10:
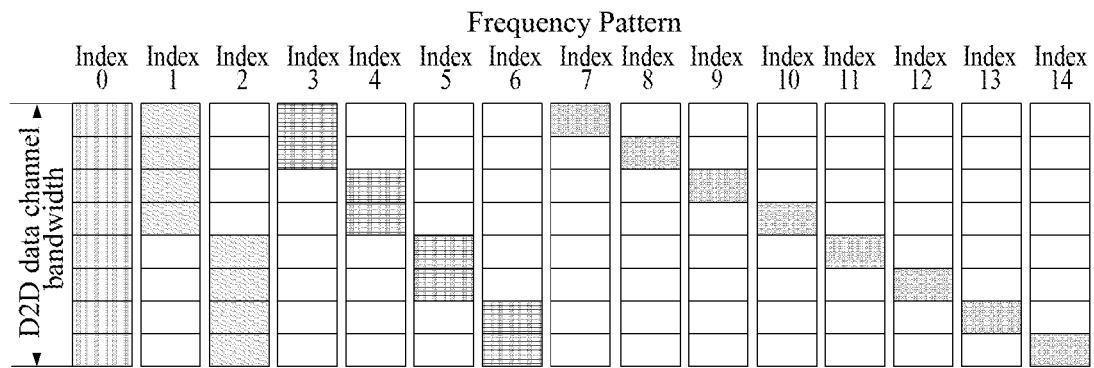
FIG. 10 illustrates a structural schematic diagram of a D2D data channel resource according to example 2 of the present document.

By taking N/N2=4 as an example and taking that there are totally M RBs in available bandwidth of the D2D data channel, a corresponding relation, which can be predefined, between each indication value of indication information of N/N2 bits and a corresponding frequency pattern is as shown in Table 2. Based on this predefined relation, UE may determine the allocation of the frequency domain resource of the corresponding D2D data channel according to the indication in the D2D data channel resource indication information. As illustrated in FIG. 10, when the D2D data channel resource indication information in the D2D control indication information of UE 1 is "0010", it indicates that a frequency pattern index #2 is adopted, i.e., the RB index allocated for use includes $$\left[\left\lceil\frac{M}{2}\right\rceil, M-1\right],$$

and when the D2D data channel resource indication information in the D2D control indication information of UE 1 is "0010", it indicates that a frequency pattern index #11 is adopted, i.e., the RB index allocated for use includes $$\left[\left\lceil\frac{M}{2}\right\rceil, \left\lceil\frac{5M}{8}\right\rceil-1\right].$$

TABLE 2

| Indication information of N/N2 bits | Frequency pattern index | RB index |
|---|---|---|
| 0000 | 0 | $[0, M-1]$ |
| 0001 | 1 | $\left[0, \left\lceil\frac{M}{2}\right\rceil-1\right]$ |
| 0010 | 2 | $\left[\left\lceil\frac{M}{2}\right\rceil, M-1\right]$ |
| 0011 | 3 | $\left[0, \left\lceil\frac{M}{4}\right\rceil-1\right]$ |
| 0100 | 4 | $\left[\left\lceil\frac{M}{4}\right\rceil, \left\lceil\frac{M}{2}\right\rceil-1\right]$ |
| 0101 | 5 | $\left[\left\lceil\frac{M}{2}\right\rceil, \left\lceil\frac{3M}{4}\right\rceil-1\right]$ |
| 0110 | 6 | $\left[\left\lceil\frac{3M}{4}\right\rceil, M-1\right]$ |
| 0111 | 7 | $\left[0, \left\lceil\frac{M}{8}\right\rceil-1\right]$ |
| 1000 | 8 | $\left[\left\lceil\frac{M}{8}\right\rceil, \left\lceil\frac{M}{4}\right\rceil-1\right]$ |
| 1001 | 9 | $\left[\left\lceil\frac{M}{4}\right\rceil, \left\lceil\frac{3M}{8}\right\rceil-1\right]$ |
| 1010 | 10 | $\left[\left\lceil\frac{3M}{8}\right\rceil, \left\lceil\frac{M}{2}\right\rceil-1\right]$ |
| 1011 | 11 | $\left[\left\lceil\frac{M}{2}\right\rceil, \left\lceil\frac{5M}{8}\right\rceil-1\right]$ |
| 1100 | 12 | $\left[\left\lceil\frac{5M}{8}\right\rceil, \left\lceil\frac{3M}{4}\right\rceil-1\right]$ |
| 1101 | 13 | $\left[\left\lceil\frac{3M}{4}\right\rceil, \left\lceil\frac{7M}{8}\right\rceil-1\right]$ |
| 1110 | 14 | $\left[\left\lceil\frac{7M}{8}\right\rceil, M-1\right]$ |
| 1111 | 15 | Reserved |

Example 3

As described in method 1, the transmitting UE indicates the time domain and frequency domain resources of the D2D data channel for bearing D2D data through the D2D data channel resource indication information in the D2D control indication information, herein the allocation of the time domain resource is indicated through N1 bits by a way of a bitmap and the frequency pattern is indicated through N2 bits to indicate the allocation of the frequency domain resource.

Figure 11:
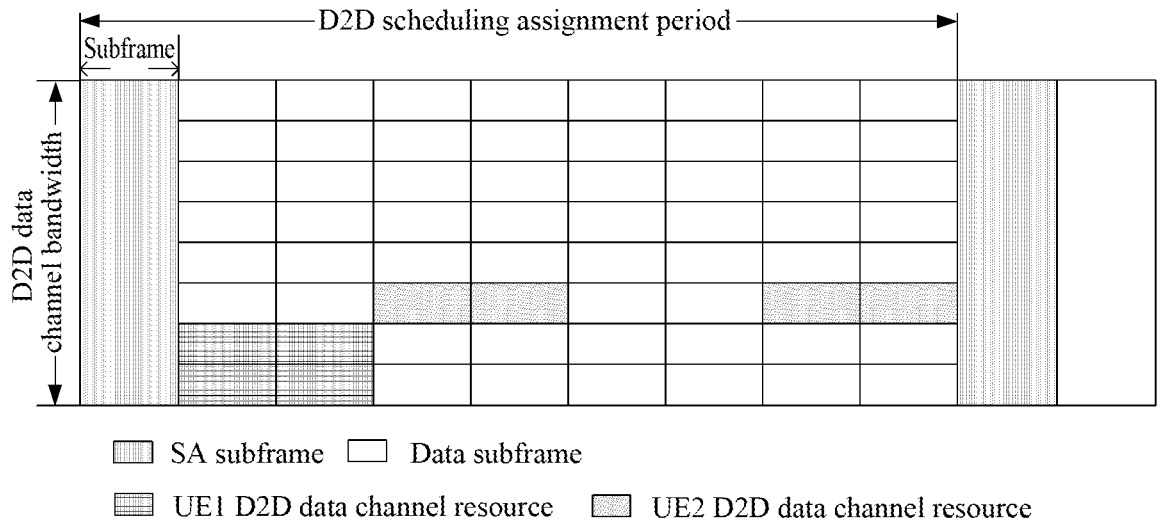
FIG. 11 illustrates a structural schematic diagram of a D2D data channel resource according to example 3 of the present document.

Description is made by taking N1=8, N2=4 and Table 2 as an example, the data channel resource indication information of UE 1 is "1100 0000"+"0110", herein "1100 0000" is time domain resource indication information and indicates that the data channel resource of the UE 1 is the first two D2D data subframes in the D2D control indication period, and the two subframes use the frequency domain resource with an RB index being $$\left[\left\lceil\frac{3M}{4}\right\rceil, M-1\right];$$

and similarly, the data channel resource indication information of UE 2 is "0011 0011"+"1100", it indicates that the data channel resource of the UE 2 is the third, fourth, seventh and eighth D2D data subframes in the D2D control indication period, and the four subframes use the frequency domain resource with an RB index being $$\left[\left\lceil\frac{5M}{8}\right\rceil, \left\lceil\frac{3M}{4}\right\rceil-1\right],$$

as illustrated in FIG. 11.

It can be seen that, through D2D data channel resource indication information of N1+N2 bits, the transmitting UE may achieve the effect of very flexibly indicating the D2D data channel resource.

Example 4

As described in method 1, the transmitting UE indicates the time domain and frequency domain resources of the D2D data channel for bearing D2D data through the D2D data channel resource indication information in the D2D control indication information, herein the resource pattern is indicated through N bits.

By taking N=4 as an example, a one-to-one corresponding relation between each indication value of the D2D data channel resource indication information and a resource pattern is predefined. An example is as shown in Table 3.

TABLE 3

| Indication information of N/N2 bits | Resource pattern index | Data subframe + RB index |
|---|---|---|
| 0000 | 0 | 1100 0000 + [0, M − 1] |
| 0001 | 1 | $0011\ 0000 + \left[0, \left\lceil\frac{M}{2}\right\rceil - 1\right]$ |
| 0010 | 2 | $0000\ 1100 + \left[\left\lceil\frac{M}{2}\right\rceil, M - 1\right]$ |
| 0011 | 3 | $0000\ 0011 + \left[0, \left\lceil\frac{M}{4}\right\rceil - 1\right]$ |
| 0100 | 4 | $0000\ 1111 + \left[\left\lceil\frac{M}{4}\right\rceil, \left\lceil\frac{M}{2}\right\rceil - 1\right]$ |
| 0101 | 5 | $0000\ 1111 + \left[\left\lceil\frac{M}{2}\right\rceil, \left\lceil\frac{3M}{4}\right\rceil - 1\right]$ |
| 0110 | 6 | $1111\ 0000 + \left[\left\lceil\frac{3M}{4}\right\rceil, M - 1\right]$ |
| 0111 | 7 | $1111\ 0000 + \left[0, \left\lceil\frac{M}{8}\right\rceil - 1\right]$ |
| 1000 | 8 | $1111\ 0000 + \left[\left\lceil\frac{M}{8}\right\rceil, \left\lceil\frac{M}{4}\right\rceil - 1\right]$ |
| 1001 | 9 | $0011\ 0000 + \left[\left\lceil\frac{M}{4}\right\rceil, \left\lceil\frac{3M}{8}\right\rceil - 1\right]$ |
| 1010 | 10 | $0000\ 1100 + \left[\left\lceil\frac{3M}{8}\right\rceil, \left\lceil\frac{M}{2}\right\rceil - 1\right]$ |
| 1011 | 11 | $0000\ 0011 + \left[\left\lceil\frac{M}{2}\right\rceil, \left\lceil\frac{5M}{8}\right\rceil - 1\right]$ |
| 1100 | 12 | $0000\ 1111 + \left[\left\lceil\frac{5M}{8}\right\rceil, \left\lceil\frac{3M}{4}\right\rceil - 1\right]$ |
| 1101 | 13 | $1111\ 0000 + \left[\left\lceil\frac{3M}{4}\right\rceil, \left\lceil\frac{7M}{8}\right\rceil - 1\right]$ |
| 1110 | 14 | $1111\ 1111 + \left[\left\lceil\frac{7M}{8}\right\rceil, M - 1\right]$ |
| 1111 | 15 | Reserved |

Figure 12:
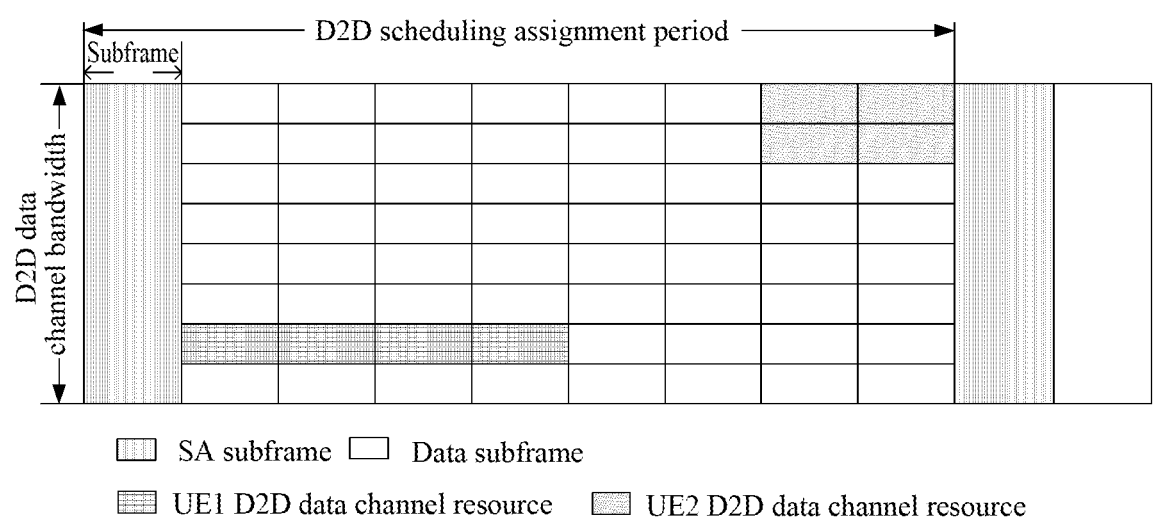
FIG. 12 illustrates a structural schematic diagram of a D2D data channel resource according to example 4 of the present document.
Figure 13:
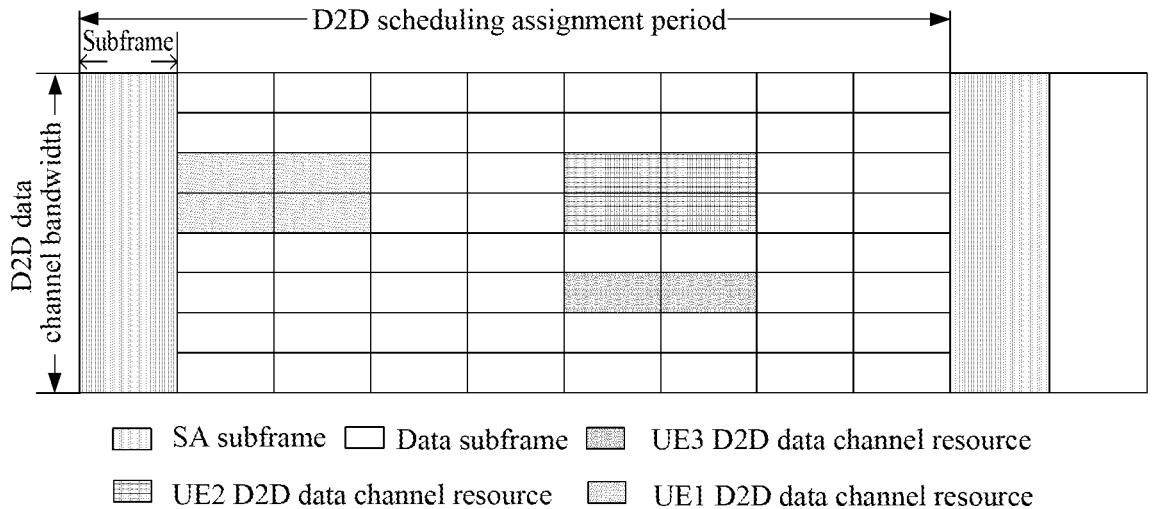
FIG. 13 illustrates a structural schematic diagram of a D2D data channel resource according to example 5 of the present document.

Based on the indication relation between the indication information of N bits and the resource pattern shown in Table 3, the D2D data channel resource indication information of UE 1 is "1101", i.e., a resource pattern index #13 is used, it indicates that the data channel resource of the UE 1 is the first four D2D data subframes in the control indication period, and the four subframes use a frequency domain resource with an RB index being $$\left[\left\lceil\frac{3M}{4}\right\rceil, \left\lceil\frac{7M}{8}\right\rceil - 1\right];$$

and the D2D data channel resource indication information of UE 2 is "0011", i.e., a resource pattern index #3 is used, it indicates that the data channel resource of the UE 2 is the last two D2D data subframes in the control indication period, and the two subframes use a frequency domain resource with an RB index being $$\left[0, \left\lceil\frac{M}{4}\right\rceil - 1\right],$$

as illustrated in FIG. 12.

It can be seen that, through D2D data channel resource indication information of N bits and the predefined frequency pattern, the transmitting UE may achieve the effect of very flexibly indicating the D2D data channel resource.

Example 5

As described in method 2, the transmitting UE indicates the time domain resource of the corresponding D2D data channel through the D2D data channel resource indication information in the D2D control indication information through indication information of N bits by a way of a timing pattern, and implicitly indicates the frequency domain resource of the D2D data channel by using the control channel index (or SA resource index) for bearing the D2D control indication information as index information.

Therein, the D2D control indication information is born on the control channel (or SA resource), and each D2D control channel index (or SA resource index) uniquely corresponds to one or more RBs. An example is as shown in Table 4.

TABLE 4

| Control channel index (SA resource index) | RB index |
|---|---|
| 0 | $[0, M-1]$ |
| 0, 1 | $\left[0, \left\lceil \frac{M}{2} \right\rceil - 1\right]$ |
| 2, 3 | $\left[\left\lceil \frac{M}{2} \right\rceil, M-1\right]$ |
| 4, 5 | $\left[0, \left\lceil \frac{M}{4} \right\rceil - 1\right]$ |
| 6, 7 | $\left[\left\lceil \frac{M}{4} \right\rceil, \left\lceil \frac{M}{2} \right\rceil - 1\right]$ |
| [8, 11] | $\left[\left\lceil \frac{M}{2} \right\rceil, \left\lceil \frac{3M}{4} \right\rceil - 1\right]$ |
| [12, 15] | $\left[\left\lceil \frac{3M}{4} \right\rceil, M-1\right]$ |
| [16, 19] | $\left[0, \left\lceil \frac{M}{8} \right\rceil - 1\right]$ |
| [20, 23] | $\left[\left\lceil \frac{M}{8} \right\rceil, \left\lceil \frac{M}{4} \right\rceil - 1\right]$ |
| [24, 31] | $\left[\left\lceil \frac{M}{4} \right\rceil, \left\lceil \frac{3M}{8} \right\rceil - 1\right]$ |
| [32, 39] | $\left[\left\lceil \frac{3M}{8} \right\rceil, \left\lceil \frac{M}{2} \right\rceil - 1\right]$ |
| [40, 47] | $\left[\left\lceil \frac{M}{2} \right\rceil, \left\lceil \frac{5M}{8} \right\rceil - 1\right]$ |
| [48, 55] | $\left[\left\lceil \frac{5M}{8} \right\rceil, \left\lceil \frac{3M}{4} \right\rceil - 1\right]$ |
| [56, 63] | $\left[\left\lceil \frac{3M}{4} \right\rceil, \left\lceil \frac{7M}{8} \right\rceil - 1\right]$ |
| [64, 71] | $\left[\left\lceil \frac{7M}{8} \right\rceil, M-1\right]$ |

Figure 1:
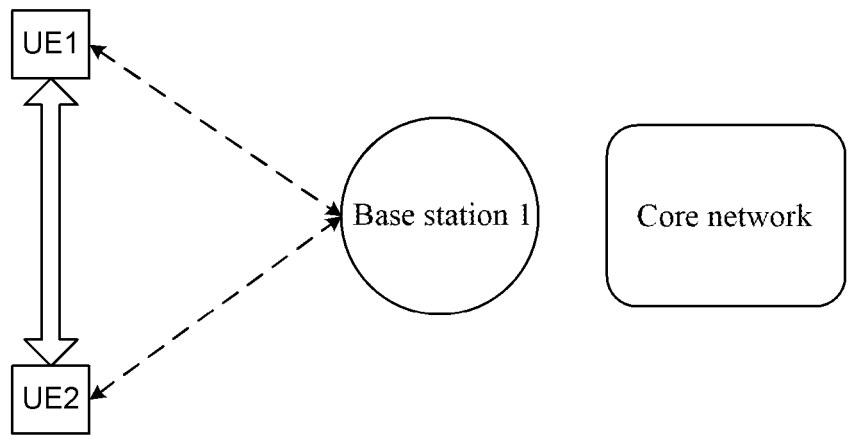
FIG. 1 illustrates a schematic diagram of a D2D communication structure according to the related art.
Figure 2:
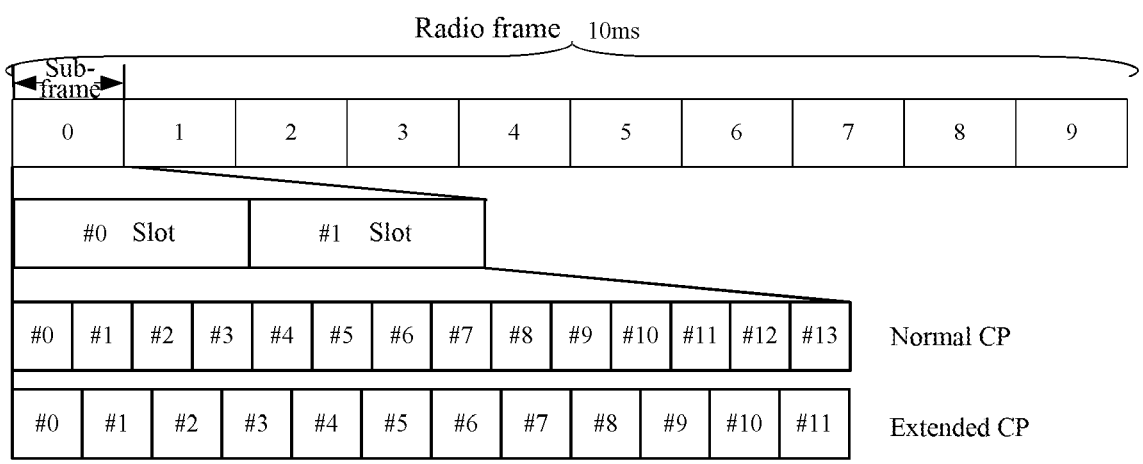
FIG. 2 illustrates a schematic diagram of an LTE system frame structure according to the related art.
Figure 3:
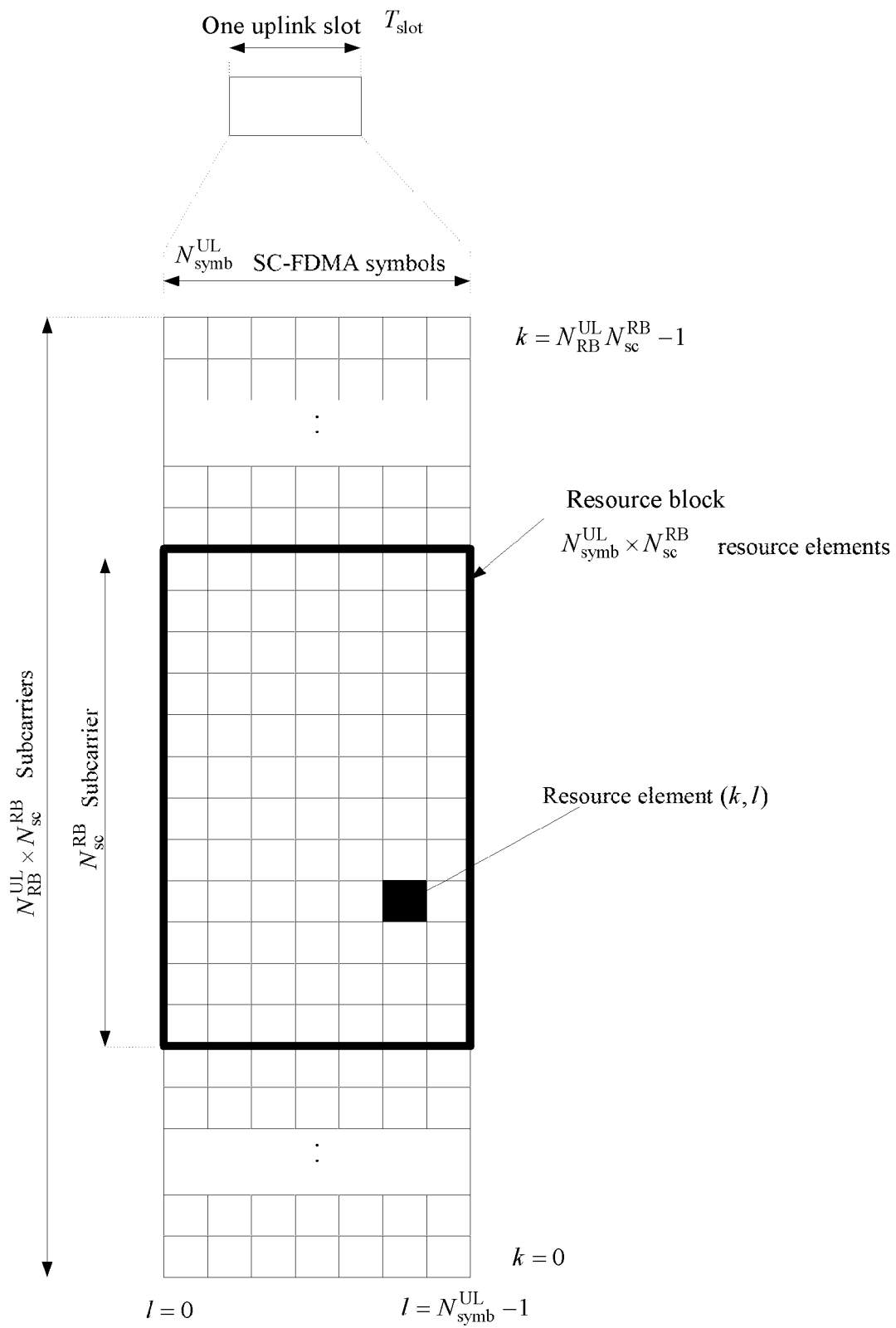
FIG. 3 illustrates a schematic diagram of an LTE system resource structure according to the related art.
Figure 4:
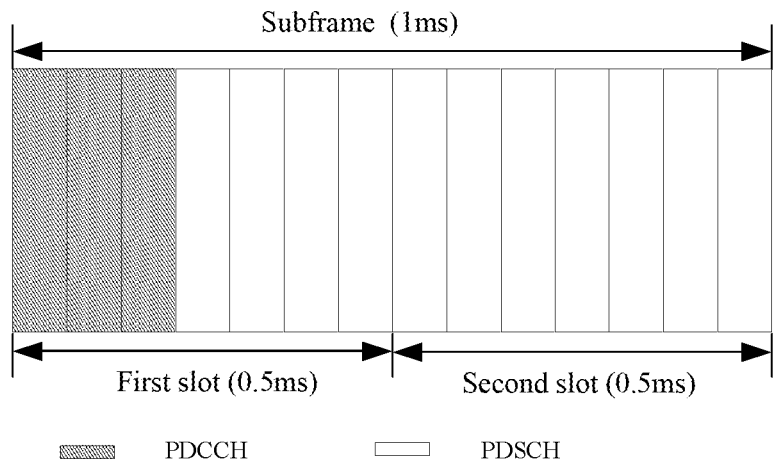
FIG. 4 illustrates a schematic diagram of a frame structure for LTE system downlink subframe scheduling and data resource indication according to the related art.

Description is made by taking N=3, Table 1 and Table 4 as an example. The D2D data channel resource indication information of UE 1 is "101", the control indication information is born on a D2D control channel index #7, the data channel resource of the UE 1 is the fifth and sixth D2D data subframes in the control indication period, and the two subframes use a frequency domain resource with an RB index being $$\left[\left\lceil \frac{M}{4} \right\rceil, \left\lceil \frac{M}{2} \right\rceil - 1\right];$$

similarly, the D2D data channel resource indication information of UE 2 is "011", the control indication information is born on a control channel index #6, the data channel resource of the UE 2 is the first two D2D data subframes in the control indication period, and the two subframes use a frequency domain resource with an RB index being $$\left[\left\lceil \frac{M}{4} \right\rceil, \left\lceil \frac{M}{2} \right\rceil - 1\right];$$

and the D2D data channel resource indication information of UE 3 is "101", the control indication information is born on a control channel index #50, the data channel resource of the UE 3 is the fifth and sixth D2D data subframes in the control indication period, and the two subframes use a frequency domain resource with an RB index being $$\left[\left\lceil \frac{5M}{8} \right\rceil, \left\lceil \frac{3M}{4} \right\rceil - 1\right],$$

as illustrated in FIG. 3.

It can be seen that, through D2D data channel resource indication information of N bits and the index information for implicit indication, the transmitting UE may achieve the effect of more flexibly indicating the D2D data channel resource through a very low control indication information overhead.

Example 6

As described in method 3, the transmitting UE indicates the frequency domain resource of the corresponding D2D data channel through the D2D data channel resource indication information in the D2D control indication information through indication information of N bits by a way of a frequency pattern, and implicitly indicates the time domain resource of the D2D data channel by using the RB index of the SA resource for bearing the D2D control indication information as index information.

Therein, the D2D control indication information is born on the SA subframe, and the RB index corresponding to the used RB resource uniquely corresponds to one or more RBs. An example is as shown in Table 5.

TABLE 5

| SA resource RB index | D2D data subframe |
|---|---|
| 0, 43 | 1111 1111 |
| 1, 2, 41, 42 | 1111 0000 |
| 3, 4, [37, 40] | 0000 1111 |
| [5, 8], [33, 36] | 1100 0000 |
| [9, 12], [29, 32] | 0011 0000 |
| [13, 16], [25, 28] | 0000 1100 |
| [17, 24] | 0000 0011 |

Figure 14:
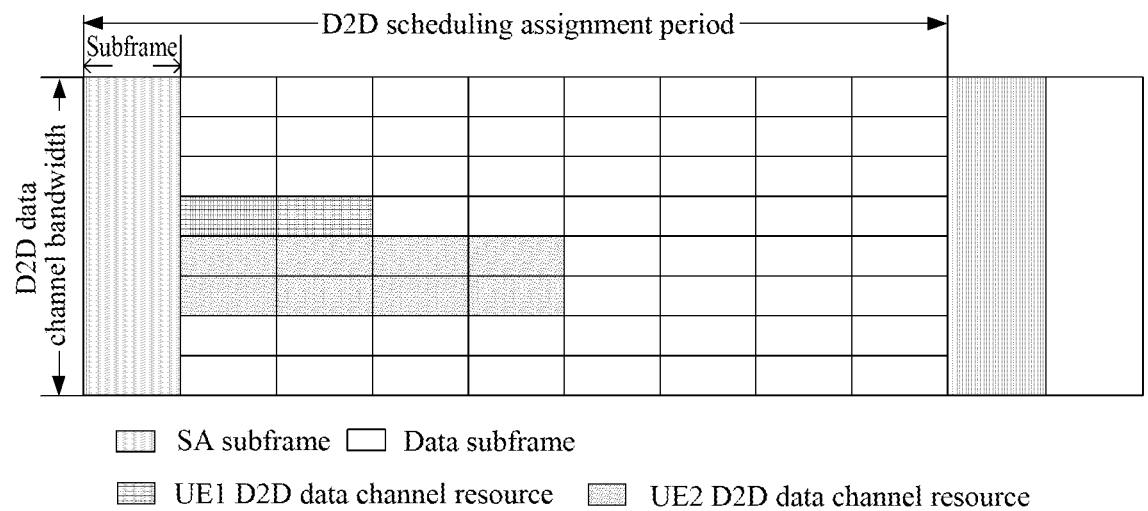
FIG. 14 illustrates a structural schematic diagram of a D2D data channel resource according to example 6 of the present document.

Description is made by taking N=4, Table 2 and Table 5 as an example, the D2D data channel resource indication information of UE 1 is "1010", the control indication information is born on an RB index #5 of the SA subframe, the data channel resource of the UE 1 is the first two D2D data subframes in the control indication period, and the two subframes use a frequency domain resource with an RB index being $$\left[\left\lceil \frac{3M}{8} \right\rceil, \left\lceil \frac{M}{2} \right\rceil - 1\right];$$

and similarly, the D2D data channel resource indication information of UE 2 is "0101", the control indication information is born on an RB index #41 of the SA subframe, the data channel resource of the UE 2 is the first four D2D data subframes in the control indication period, and the four subframes use a frequency domain resource with an RB index being $$\left[\left[\frac{M}{2}\right], \left[\frac{3M}{4}\right]-1\right],$$

as illustrated in FIG. 14.

It can be seen that, through D2D data channel resource indication information of N bits and the index information for implicit indication, the transmitting UE may achieve the effect of more flexibly indicating the D2D data channel resource through a very low control indication information overhead.

Example 7

As described in method 4, the transmitting UE implicitly indicates the time domain and frequency domain resources of the D2D data channel by using the SA resource index for bearing the D2D control indication information as index information.

Figure 15:
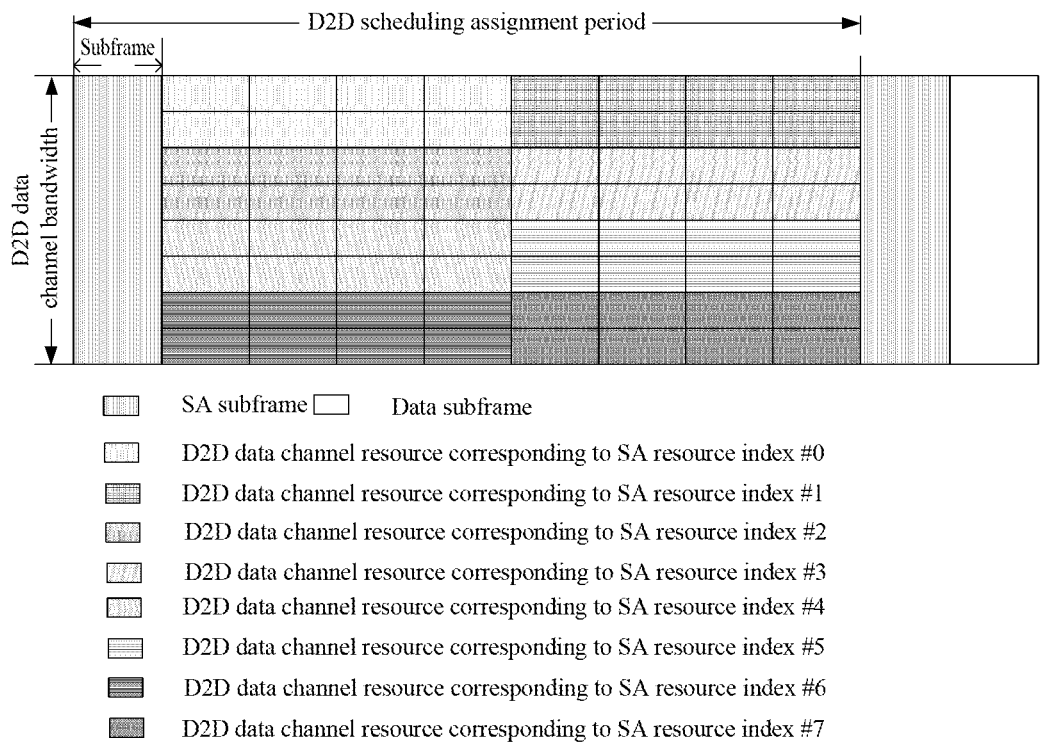
FIG. 15 illustrates a structural schematic diagram 1 of a D2D data channel resource according to example 7 of the present document.

A predefined corresponding relation between SA resource indexes and D2D data channel resources is, for example, as illustrated in FIG. 15, each SA resource index corresponds to fixed time domain and frequency domain resources, and the number of D2D data subframes contained by the D2D data channel resource corresponding to each SA resource index is the same and the number of RBs on each subframe is the same.

Figure 16:
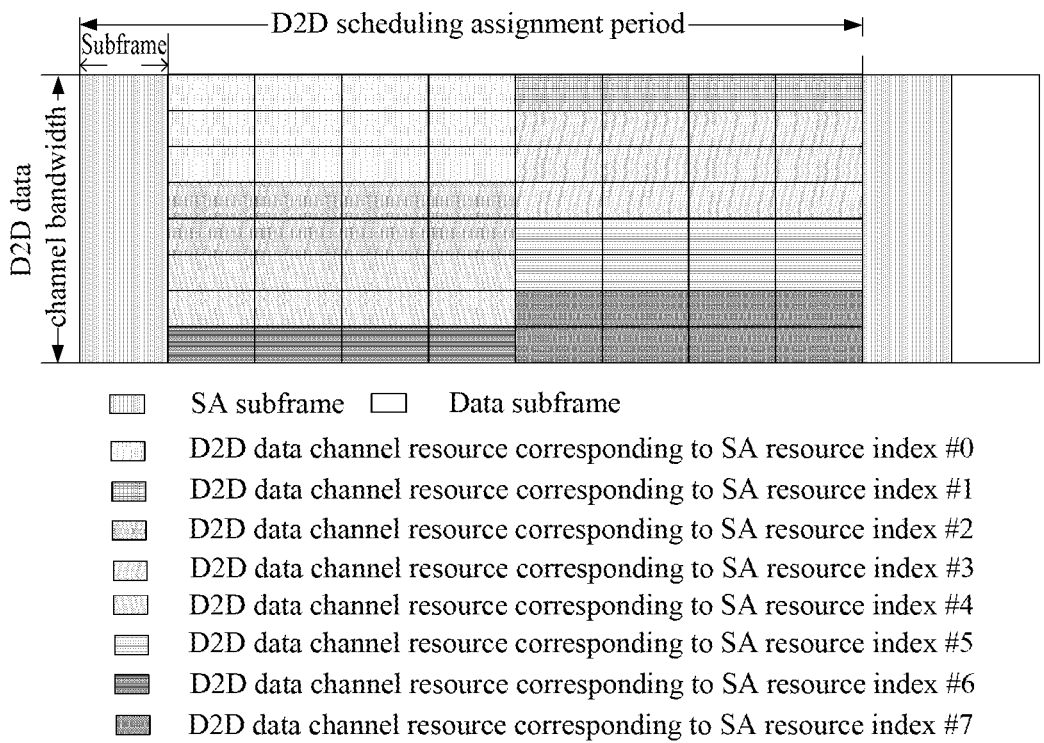
FIG. 16 illustrates a structural schematic diagram 2 of a D2D data channel resource according to example 7 of the present document.

A predefined corresponding relation between SA resource indexes and D2D data channel resources is, for example, as illustrated in FIG. 16, each SA resource index corresponds to fixed time domain and frequency domain resources, and the number of D2D data subframes contained by the D2D data channel resource corresponding to each SA resource index is the same, but the number of corresponding RBs may be different.

Figure 17:
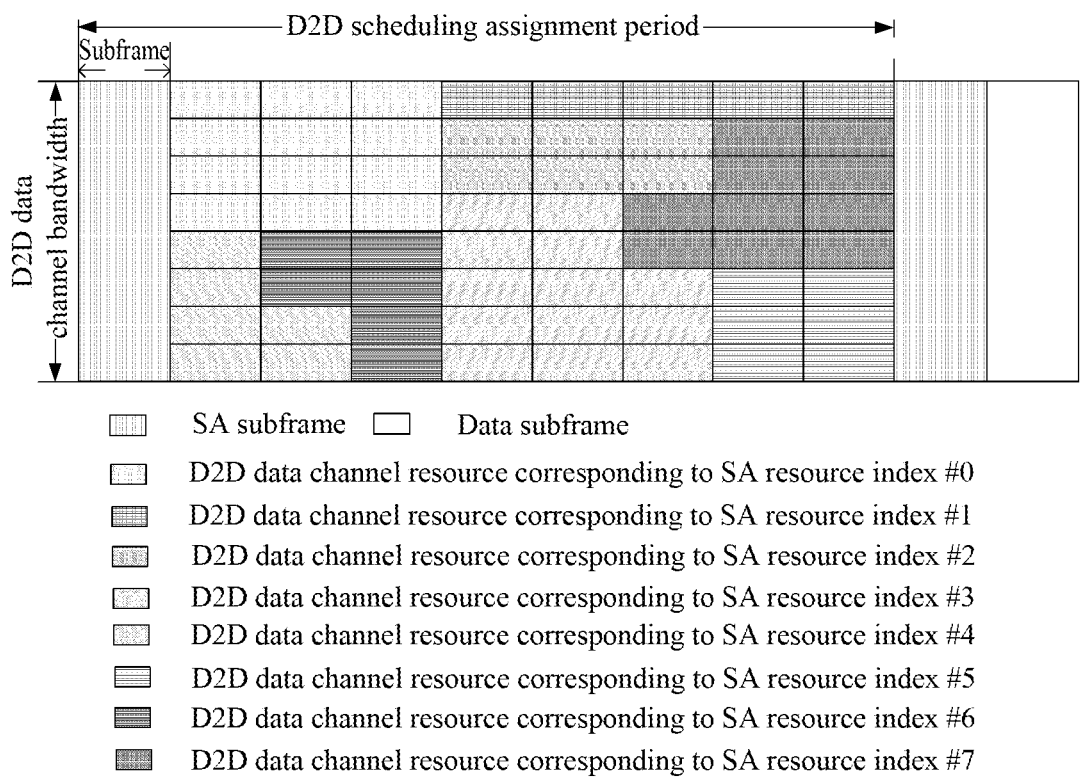
FIG. 17 illustrates a structural schematic diagram 3 of a D2D data channel resource according to example 7 of the present document.

A predefined corresponding relation between SA resource indexes and D2D data channel resources is, for example, as illustrated in FIG. 17, each SA resource index corresponds to fixed time domain and frequency domain resources, and the number of D2D data subframes contained by the D2D data channel resource corresponding to each SA resource index and the number of RBs on each subframe may be predefined to be different as required.

It can be seen that, by implicitly indicating the time domain and frequency domain resources through the index information corresponding to the D2D control indication information, the transmitting UE may implicitly indicate the used D2D data channel resource without needing any indication signaling overhead, and the control indication overhead of D2D communication is minimized.

INDUSTRIAL APPLICABILITY

Through the embodiment of the present document, with the method that, UE indicates a D2D data channel resource through D2D data channel resource indication information in D2D control indication information and/or index information corresponding to the D2D control indication information; and the UE sends D2D communication data on the D2D data channel resource, herein the UE indicating the D2D data channel resource through the D2D data channel resource indication information and/or the index information includes at least one of the following: the UE indicating a time domain resource and a frequency domain resource of the D2D data channel through the D2D data channel resource indication information; the UE indicating the time domain resource of the D2D data channel through the D2D data channel resource indication information and indicating the frequency domain resource of the D2D data channel through the index information; the UE indicating the frequency domain resource of the D2D data channel through the D2D data channel resource indication information and indicating the time domain resource of the D2D data channel through the index information; and the UE indicating the time domain resource and the frequency domain resource of the D2D data channel through the index information, the problem that the transmitting UE for D2D communication is unable to indicate the used D2D data channel resource is solved, and the indication of the D2D data channel resource between D2D UE is realized.

Obviously, one skilled in the art should understand that all modules and all steps of the present document may be implemented by using general-purpose computing devices, they may be integrated in a single computing device or distributed on a network consisting of a plurality of computing devices, optionally they may be implemented by using program codes executable by computing devices, and thus they may be stored in memory devices and executed by computing devices, or they may be respectively manufactured into integrated circuit modules or a plurality of modules or steps thereof may be manufactured into a single integrated circuit module to implement. Therefore, the present document is not limited to any specific combination of hardware and software.

The embodiments described above are just preferred embodiments of the present document and are not used for limiting the present document. For one skilled in the art, the present document may have various modifications and variations. Any modification, equivalent replacement, improvement and the like made within the essence and principle of the present document shall be still included in the protection scope of the present document.

What is claimed is:

1. A communication data sending method, comprising: user equipment UE indicating a Device to Device (D2D) data channel resource through D2D data channel resource indication information in D2D control indication information, wherein the D2D control indication information is born on one of following resources: D2D control channel resource, D2D data channel resource and D2D scheduling indication resource; and the UE sending D2D communication data on the D2D data channel resource, wherein the UE indicating the D2D data channel resource through the D2D data channel resource indication information comprises:

the UE indicating a time domain resource and a frequency domain resource of D2D data channel through the D2D data channel resource indication information;

wherein the D2D data channel resource indication information is contained in the D2D control indication information and indicates the time domain resource and the frequency domain resource of the D2D data channel through indication information of N bits, wherein, under a situation that the D2D data channel resource indication information indicates the time domain resource and the frequency domain resource of the D2D data channel through the indication information of N bits, the method further comprises:

indicating the time domain resource of the D2D data channel through indication information of N1 bits, and indicating the frequency domain resource of the D2D data channel through indication information of N2 bits, wherein N1+N2=N, wherein under a situation that the D2D data channel resource indication information indicates the time domain resource of the D2D data channel through indication information of N1 bits, the method further comprises:

indicating the time domain resource of the D2D data channel through the indication information of N1 bits by a way of a timing pattern, wherein the time domain resource of the D2D data channel refers to one or more D2D data subframes contained by the D2D data channel in a time domain and used for sending the D2D communication data.

2. The method according to claim 1, wherein, under a situation that the time domain resource of the D2D data channel is indicated through the indication information of N1 bits by a way of the timing pattern, the method further comprises:

indicating the one or more D2D data subframes contained by the D2D data channel in the time domain through indication information of N1 bits according to a predefined corresponding relation between indication information of N1 bits and the timing pattern, wherein, the predefined corresponding relation between the indication information of N1 bits and the timing pattern comprises: each predefined value of indication information of N1 bits corresponding to a fixed timing pattern of the D2D data subframe, wherein the timing pattern contains one or more fixed D2D data subframes.

3. The method according to claim 1, wherein, under a situation that the D2D data channel resource indication information indicates the frequency domain resource of the D2D data channel through indication information of N2 bits, the method further comprises:

indicating one or more RBs contained by the D2D data channel in the frequency domain through the indication information of N2 bits in a resource allocation indication type 0 or a resource allocation indication type 1, or, wherein, under a situation that the D2D data channel resource indication information indicates the frequency domain resource of the D2D data channel through indication information of N2 bits, the method further comprises:

indicating one or more RBs contained by the D2D data channel in the frequency domain through indication information of N2 bits according to a predefined corresponding relation between indication information of N2 bits and a frequency pattern, wherein, the predefined corresponding relation between the indication information of N2 bits and the frequency pattern comprises: each predefined value of indication information of N2 bits corresponding to a fixed frequency pattern, wherein the frequency pattern contains one or more fixed RBs.

4. The method according to claim 3, wherein the indication information of N2 bits is further used for indicating whether to perform frequency hopping on the frequency domain resource of the D2D data channel and a mode for performing the frequency hopping.

5. A communication data sending device, located in User Equipment UE, comprising a processor and a storage device, wherein the storage device stores processor-executable programs, and the programs comprise:

an indication module configured to indicate a Device to Device (D2D) data channel resource through D2D data channel resource indication information in D2D control indication information; bear the D2D control indication information on one of the following resources for sending: D2D control channel resource, D2D data channel resource and D2D scheduling indication resource; and a sending module configured to send D2D communication data on the D2D data channel resource, wherein the indication module is configured to indicate a time domain resource and a frequency domain resource of D2D data channel through the D2D data channel resource indication information;

wherein the indication module is further configured to generate the D2D control indication information, wherein the D2D data channel resource indication information is contained in the D2D control indication information and indicates the time domain resource and the frequency domain resource of the D2D data channel through indication information of N bits, wherein the indication module is further configured to:

indicate the time domain resource of the D2D data channel through indication information of N1 bits, and indicate the frequency domain resource of the D2D data channel through indication information of N2 bits, wherein N1+N2=N, wherein under a situation that the D2D data channel resource indication information indicates the time domain resource of the D2D data channel through indication information of N1 bits, the indication module is further configured to:

indicate the time domain resource of the D2D data channel through the indication information of N1 bits by a way of a timing pattern, wherein the time domain resource of the D2D data channel refers to one or more D2D data subframes contained by the D2D data channel in a time domain and used for sending the D2D communication data.

6. The device according to claim 5, wherein, under a situation that the time domain resource of the D2D data channel is indicated through the indication information of N1 bits by a way of the timing pattern, the indication module is further configured to:

indicate the one or more D2D data subframes contained by the D2D data channel in the time domain through indication information of N1 bits according to a predefined corresponding relation between indication information of N1 bits and the timing pattern, wherein, the predefined corresponding relation between the indication information of N1 bits and the timing pattern comprises: each predefined value of indication information of N1 bits corresponding to a fixed timing pattern of the D2D data subframes, wherein the timing pattern contains one or more fixed D2D data subframes.

7. The device according to claim 5, wherein, under a situation that the D2D data channel resource indication information indicates the frequency domain resource of the D2D data channel through indication information of N2 bits, the indication module is further configured to:

indicate one or more RBs contained by the D2D data channel in the frequency domain through the indication information of N2 bits in a resource allocation indication type 0 or a resource allocation indication type 1, or, wherein, under a situation that the D2D data channel resource indication information indicates the frequency domain resource of the D2D data channel through indication information of N2 bits, the indication module is further configured to:

indicate one or more RBs contained by the D2D data channel in the frequency domain through indication information of N2 bits according to a predefined corresponding relation between indication information of N2 bits and a frequency pattern, wherein, the predefined corresponding relation between the indication information of N2 bits and the frequency pattern comprises: each predefined value of indication information of N2 bits corresponding to a fixed frequency pattern, wherein the frequency pattern contains one or more fixed RBs.

8. The device according to claim 7, wherein the indication module is further configured to indicate whether to perform frequency hopping on the frequency domain resource of the D2D data channel and a mode for performing the frequency hopping through the indication information of N2 bits.

* * * * *